(12) United States Patent
Yilmaz

(10) Patent No.: US 9,495,042 B2
(45) Date of Patent: Nov. 15, 2016

(54) TWO-DIMENSIONAL POSITION SENSOR

(75) Inventor: Esat Yilmaz, Southhampton (GB)

(73) Assignee: Atmel Corporation, San Jose, CA (US)

( * ) Notice: Subject to any disclaimer, the term of this patent is extended or adjusted under 35 U.S.C. 154(b) by 648 days.

(21) Appl. No.: 12/423,148

(22) Filed: Apr. 14, 2009

(65) Prior Publication Data
US 2010/0258360 A1 Oct. 14, 2010

(51) Int. Cl.
*G06F 3/044* (2006.01)
(52) U.S. Cl.
CPC ..................... *G06F 3/044* (2013.01)
(58) Field of Classification Search
CPC ........................................................ G06F 3/044
USPC .................... 178/18.05; 341/33, 22; 345/168
See application file for complete search history.

(56) References Cited

U.S. PATENT DOCUMENTS

| | | | |
|---|---|---|---|
| 4,879,461 A | 11/1989 | Philipp | |
| 5,650,597 A | 7/1997 | Redmayne | |
| 5,825,352 A | 10/1998 | Bisset et al. | |
| 6,452,514 B1 | 9/2002 | Philipp | |
| 6,993,607 B2 | 1/2006 | Philipp | |
| 7,663,607 B2 * | 2/2010 | Hotelling et al. | 345/173 |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,274,488 B2 * | 9/2012 | Bae | G06F 3/0416 345/156 |
| 2007/0279395 A1 * | 12/2007 | Philipp | G01R 27/2605 345/173 |
| 2008/0246496 A1 | 10/2008 | Hristov | |
| 2009/0315854 A1 | 12/2009 | Matsuo | |

(Continued)

FOREIGN PATENT DOCUMENTS

| CN | 1782837 A | 12/2005 |
|---|---|---|
| EP | 1335318 A2 | 8/2003 |

(Continued)

OTHER PUBLICATIONS

US 5,730,461, 03/1998, Philipp (withdrawn).

(Continued)

*Primary Examiner* — Lixi C Simpson
(74) *Attorney, Agent, or Firm* — Baker Botts, LLP

(57) ABSTRACT

A two dimensional position sensor having a touch-sensitive panel defined by a single-layer electrode pattern arranged on one side of a substrate. The electrode pattern is made up of 'n' electrode units extending row-wise over the panel. Each electrode unit is made up of a single drive electrode extending across the touch-sensitive area of the panel and a plurality of 'm' sense electrodes, which collectively laterally extend across the touch-sensitive area and individually each occupy only a portion of the lateral extent. The sense electrodes are longitudinally offset from their associated drive electrode so that one edge of each sense electrode lies adjacent to one edge of the drive electrode, these coupling edges being separated by a gap dimensioned so that in use each pair of drive and sense electrodes have efficient capacitively coupling across the gap. This electrode pattern allows the longitudinal extent of each electrode unit to be made relatively small, which in turn is better for sensing multiple simultaneous touches, since this benefits from having more electrode units in any given panel.

22 Claims, 11 Drawing Sheets

(56) References Cited

U.S. PATENT DOCUMENTS

| | | |
|---|---|---|
| 2010/0044122 A1* | 2/2010 | Sleeman et al. ........... 178/18.06 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |

FOREIGN PATENT DOCUMENTS

| | | |
|---|---|---|
| WO | 2009007704 A1 | 1/2009 |
| WO | WO 2012/129247 | 9/2012 |

OTHER PUBLICATIONS

Atmel Corporation, "Touch Sensors Design Guide" ; Jan. 22, 2009; http://www.atmel.com/dyn/resources/prod_documents/doc10620.pdf.

U.S. Appl. No. 13/278,046, filed Oct. 20, 2011, Yilmaz.

U.S. Appl. No. 61/454,936, filed Mar. 21, 2011, Myers.

U.S. Appl. No. 61/454,950, filed Mar. 21, 2011, Lynch.

U.S. Appl. No. 61/454,894, filed Mar. 21, 2011, Rothkopf.

First Office Action Issued by State Intellectual Property Office of China for Application No. 201010146122.3; translation included, Aug. 22, 2013.

* cited by examiner (RAW)

(SUB BACKGROUND)

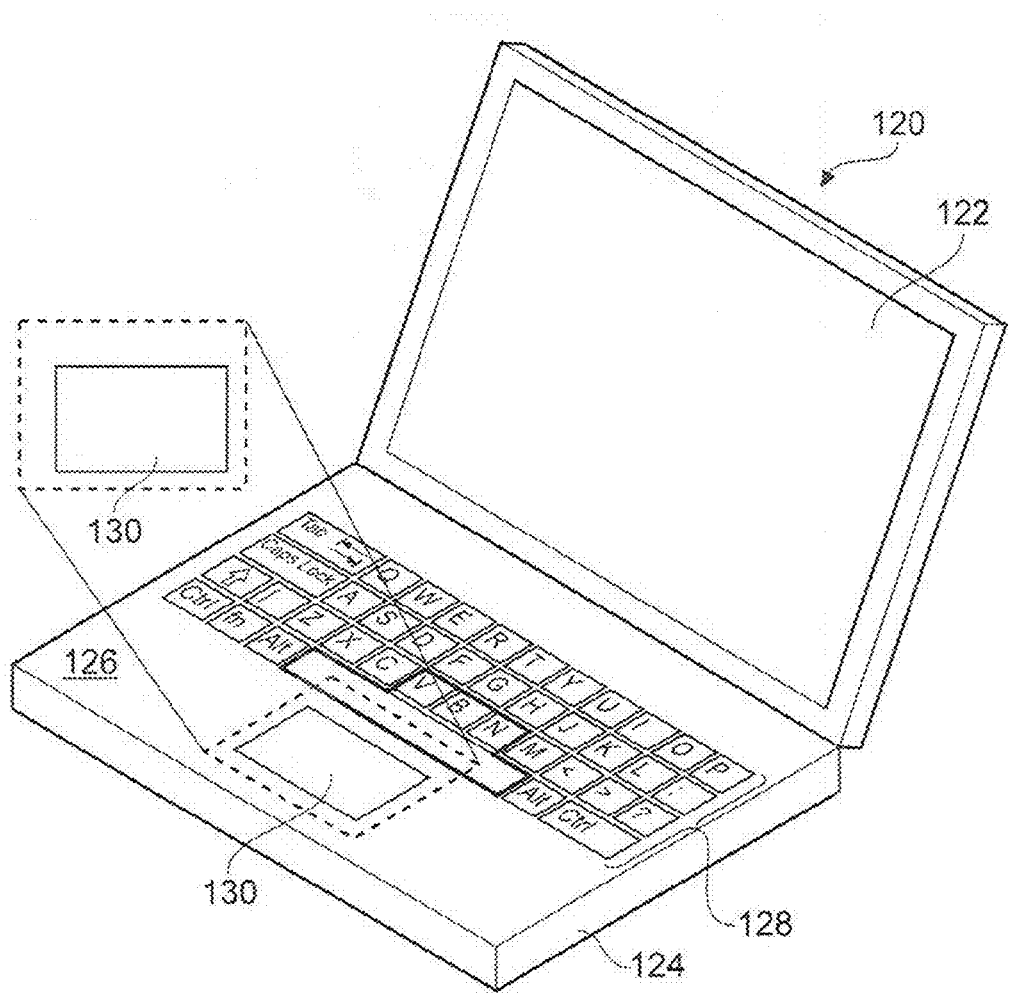
FIG. 5
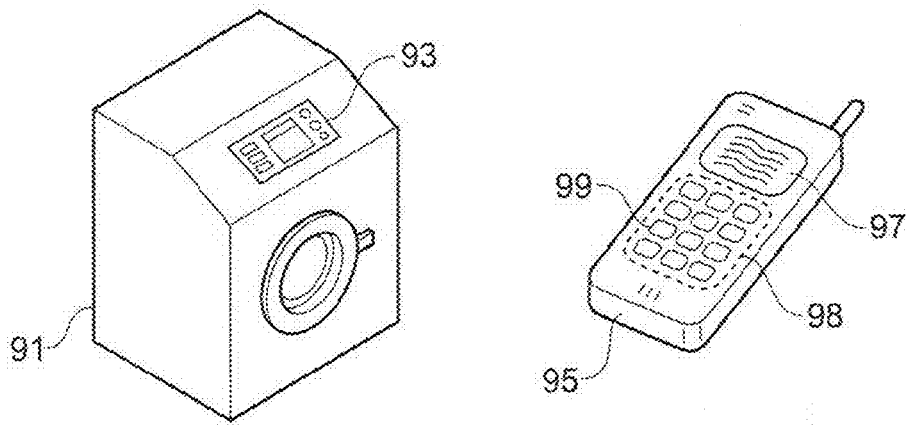
FIG. 6
FIG. 7

TWO-DIMENSIONAL POSITION SENSOR

BACKGROUND OF THE INVENTION

The invention relates to 2-dimensional position sensors. More particularly the invention relates to 2-dimensional position sensors of the type based on capacitive proximity sensing techniques. Such sensors may be referred to as 2-dimensional capacitive transducing (2DCT) sensors. 2DCT sensors are based on detecting a disturbance in a capacitive coupling caused by the proximity of a pointing object. A measured location for the disturbance corresponds to a measured position for the pointing object.

2DCT sensors are typically actuated by a human finger, or a stylus. Example devices include touch screen and touch sensitive keyboards/keypads, e.g. as used for controlling consumer electronic devices/domestic appliances, and possibly in conjunction with an underlying display, such as a liquid crystal display (LCD), or cathode ray tube (CRT). Other devices which may incorporate 2DCT sensors include pen-input tablets and encoders used in machinery for feedback control purposes, for example. 2DCT sensors are capable of reporting at least a 2-dimensional coordinate, Cartesian or otherwise, related to the location of an object or human body part, by means of a capacitance sensing mechanism.

Devices employing 2DCT sensors have become increasingly popular and common, not only in conjunction with personal computers, but also in all manner of other appliances such as personal digital assistants (PDAs), point of sale (POS) terminals, electronic information and ticketing kiosks, kitchen appliances and the like. 2DCT sensors are frequently preferred to mechanical switches for a number of reasons. For example, 2DCT sensors require no moving parts and so are less prone to wear than their mechanical counterparts. 2DCT sensors can also be made in relatively small sizes so that correspondingly small, and tightly packed keypad arrays can be provided. Furthermore, 2DCT sensors can be provided beneath an environmentally sealed outer surface/cover panel. This makes their use in wet environments, or where there is a danger of dirt or fluids entering a device being controlled attractive. Furthermore still, manufacturers often prefer to employ interfaces based on 2DCT sensors in their products because such interfaces are often considered by consumers to be more aesthetically pleasing than conventional mechanical input mechanisms (e.g. push-buttons).

US 2008/0246496, published on 9 Oct. 2008 describes a 2DCT sensor comprising a substrate with a sensitive area defined by a pattern of electrodes. The 2DCT is of the so-called "active" or "mutual" type in which proximity of an object is sensed by the changes it induces in coupling between a drive electrode and one or more adjacent sense electrodes. Measurement of the coupling is carried out by applying a transient voltage to the drive electrode and making a measurement of the capacitance between the drive and associated sense electrode(s) that results.

In the specific prior art design of US 2008/0246496 the drive and sense electrodes are arranged in a single layer on one side of a substrate—typically the underside of a touch panel made of glass or a plastics material. Having a single layer electrode pattern is a generally desirable feature, since it provides simplicity, lower cost and a low profile.

FIG. 8 of the accompanying drawings illustrates schematically a representative portion of the prior art electrode pattern of US 2008/0246496. The electrodes 12 are drive electrodes represented by longitudinal bars extending in the x-direction. Adjacent drive electrodes 12 are spaced apart by three groups 2, 4, 6 of sense electrodes which are tapered in the x-direction so that permutations of 2 out of the 3 groups co-extend over different portions of the lateral extent of the panel. Each central sense electrode 4 is connected to an external circuit connection $S_2$ via a conductive trace 5 that divides the adjacent side sense electrode 6 into two portions 6A and 6B separated by a channel, with an additional trace 3 extending to separate the left-hand portions 2A and 2B of electrode 2. The side electrodes 2 and 4 are connected to the external circuit via connections $S_1$ and $S_3$ respectively. In use, the position of an object is determined in a measurement acquisition cycle in which the bar electrodes 12 are sequentially driven by respective drive channels and the amount of charge transferred to the sense electrodes from each bar electrode is determined by the sense channels.

While providing good resolution in the x-direction a consequence of this design approach is that each group of sense electrodes has a significant vertical thickness, i.e. dimension in the y-direction. The vertical repeat period dimension P is therefore quite large and difficult to reduce owing to the complexity of the sense electrode patterning. For a finger actuated device, as long as the dimension P is comparable to a finger press dimension, there is no problem with vertical resolution. However, a problem does arise when there is a desire to operate the 2DCT in multi-touch mode.

WO 2009/00704A1 describes a 2DCT capable of detecting multiple simultaneous touches, as well as summarizing the prior art multi-touch approach of U.S. Pat. No. 5,825,352. WO 2009/00704A1 detects multiple simultaneous touches using a development of the technique described in U.S. Pat. No. 6,993,607. The touch panel of WO 2009/00704A1 delivers sets of capacitance signal values to a processor which computes the coordinates of single or multiple touch locations on the touch panel. The processing of each set is performed by (i) identifying the sensing element having the largest capacitance signal value; (ii) defining a region around that sensing element; and (iii) repeating the process iteratively, wherein each subsequent identifying step excludes signals that lie in previously defined regions. A multi-touch sensor is thus provided in which the signal processing is based on successive definition of regions or sub-blocks in the touch panel. Depending on the processing carried out, to be resolvable simultaneous touches must be separated by one or two clear sub-blocks (using the language of WO 2009/00704A1) or drive/sense electrode units (using the language of the present application).

Consequently, to distinguish between multiple simultaneous touches in a 2DCT made up of a plurality of drive/sense electrode units extending in the x-direction, the touches need to be separated in the y-direction by at least 2, in practice probably at least 3, drive/sense electrode units. So, for example, if a touch screen or touch panel has a limited vertical dimension of say 60 mm, and the electrode units have a vertical dimension of 10 mm, then a maximum of 6 electrode units will fit in, so the screen will only be able to detect up to 2 or 3 simultaneous touches, depending on their position on the screen. On the other hand, if the electrode units have a smaller vertical dimension of say 6 mm, then 10 of them can be provided, and the screen will be able to detect up to 3 or 4 simultaneous touches.

It would therefore be desirable to provide a single-layer electrode pattern suitable for a 2DCT of the active or mutual type that can be embodied with a relatively small vertical repeat period dimension for the drive/sense electrode units.

SUMMARY OF THE INVENTION

According to a first aspect of the invention there is provided a two dimensional position sensor having a touch-sensitive area defined by a single-layer electrode pattern arranged on one side of a substrate, the electrode pattern having a lateral extent in a first direction and a longitudinal extent in a second direction transverse thereto and comprising a plurality of 'n' electrode units, where n is at least 3, extending row-wise over the touch-sensitive area longitudinally offset from one another, wherein the electrode units each comprise a drive electrode laterally extending across the touch-sensitive area and a plurality of 'm' sense electrodes, wherein m is at least 3, which collectively laterally extend across the touch-sensitive area and individually each occupy a portion of the lateral extent, the sense electrodes of each unit being longitudinally offset from the drive electrode so that one edge of each sense electrode lies adjacent to one edge of the drive electrode, these coupling edges being separated by a gap dimensioned so that in use each pair of drive and sense electrodes capacitively couple across the gap.

The sense electrodes of each unit may have different lateral extents. The different lateral extents can alternate between first and second values for laterally adjacent sense electrodes.

The portion of lateral extent occupied by each sense electrode may beneficially be unique for that electrode unit, i.e. there is no co-extension in the first direction of any two sense electrodes in a given electrode unit.

Laterally extending ground electrodes can be arranged between adjacent electrode units to screen them from each other and thereby suppress capacitive coupling between adjacent electrode units. This serves to decouple the drive electrodes from connectivity tracks to the sense electrodes.

Tracks extending from the periphery of the touch sensitive area to connect to respective ones of the sense electrodes can be arranged to extend adjacent to a further edge of the sense electrodes opposed to the coupling edge. In some embodiments, the tracks have extension portions that extend in the first direction arranged between the sense electrodes of the electrode unit and a drive electrode of an adjacent electrode unit. The extension portions may screen one or more of the drive electrodes of the electrode unit of which they form part of from a sense electrode of an adjacent electrode unit, thereby suppressing capacitive coupling between adjacent electrode units. The extensions portions may also be used to tune the electric field locally. If extension portions of this kind are provided, separate ground electrodes can be omitted, although they could be provided in combination.

In one embodiment, the tracks from the sense electrodes all connect to one lateral side of the touch-sensitive area. In another embodiment, some of the tracks from the sense electrodes connect to one lateral side of the touch-sensitive area and the other tracks connect to the other lateral side, preferably in equal or approximately equal number. This reduces the longitudinal extent occupied by the tracks, thereby reducing the longitudinal extent of the electrode unit.

The electrode pattern can allow for a small longitudinal extent of each electrode unit. Specifically, each electrode unit may have a longitudinal extent of no more than 15 mm, 14 mm, 13 mm, 12 mm, 11 mm, 10 mm, 9 mm, 8 mm, 7 mm, 6 mm, 5 mm, 4 mm or 3 mm. Preferably, each electrode unit may have a longitudinal extent of no more than 7 mm, 6 mm, 5 mm, 4 mm or 3 mm. The drive and sense electrodes may each have a longitudinal extent of no more than 2 mm, 1 mm or 0.5 mm. The coupling gap between each pair of drive and sense electrodes preferably each have a longitudinal extent of no more than 0.5 mm, 0.4 mm, 0.3 mm, 0.2 mm or 0.1 mm. The tracks extending from the periphery of the touch sensitive area to connect to respective ones of the sense electrodes preferably each have a longitudinal extent of no more than 0.5 mm, 0.4 mm, 0.3 mm, 0.2 mm or 0.1 mm. The compact longitudinal extent of the electrode units means that the number 'n' of such units may be larger than otherwise possible, for example at least 6, 7, 8, 9, 10, 11, 12, 13, 14, 15, 16, 17, 18, 19, or 20, for example. Moreover, the number of sense electrodes per electrode unit may be at least 4, 5, 6, 7, 8, 9, or 10, for example. The optional ground electrodes may each have a longitudinal extent of no more than 0.5 mm, 0.4 mm, 0.3 mm or 0.2 mm, and are preferably substantially thinner than the drive and sense electrodes.

To enable multi-touch sensing the sensor would further comprise suitable processing elements, such as:

(a) a capacitance measurement circuit connected to the electrodes and operable repeatedly to acquire sets of capacitance signal values from the touch-sensitive area, each set being made up of a capacitance signal value from each pair of drive and sense electrodes, each pair constituting a sensing element; and (b) a processor connected to receive the sets of capacitance signal values and operable to process each set to compute and output coordinates of single or multiple touch locations on the touch-sensitive area, the processing of each set being performed by:

(i) identifying the sensing element having the largest capacitance signal value;

(ii) defining a region of the touch-sensitive area including said sensing element having the largest capacitance signal value and selected ones of its neighbors;

(iii) identifying and defining one or more further sensing elements and regions respectively, wherein each iteration excludes capacitance signal values from consideration if they lie in previously defined regions of the touch-sensitive area; and (iv) outputting data indicating the coordinates of the touch location in each region identified.

According to a second, alternative, aspect of the invention there is provided a two dimensional position sensor having a touch-sensitive area defined by a single-layer electrode pattern arranged on one side of a substrate, the electrode pattern having a lateral extent in a first direction and a longitudinal extent in a second direction transverse thereto and comprising a plurality of 'n' electrode units, where n is at least 3, extending column-wise over the touch-sensitive area laterally offset from one another, wherein the electrode units each comprise a sense electrode longitudinally extending down the touch-sensitive area and a plurality of 'm' drive electrodes, wherein m is at least 3, which collectively longitudinally extend down the touch-sensitive area and individually each occupy a portion of the longitudinal extent, the drive electrodes of each unit being laterally offset from the sense electrode so that one edge of each drive electrode lies adjacent to one edge of the sense electrode, these coupling edges being separated by a gap dimensioned so that in use each pair of drive and sense electrodes capacitively couple across the gap.

It will be understood this second aspect of the invention is conceptually similar to the first aspect of the invention in terms of the novel geometry of the electrode patterns, but the pattern is implemented essentially by swapping the drive and sense electrodes.

The portion of longitudinal extent occupied by each drive electrode may beneficially be unique for that electrode unit, i.e. there is no co-extension in the second direction of any two drive electrodes in a given electrode unit.

The sensor may further comprise longitudinally extending ground electrodes arranged between adjacent electrode units to screen them from each other and thereby suppress capacitive coupling between adjacent electrode units.

The sensor may further comprise tracks extending from the periphery of the touch sensitive area to connect to respective ones of the drive electrodes, wherein the tracks extend adjacent to a further edge of the drive electrodes opposed to the coupling edge. The tracks can have extension portions that extend in the second direction arranged between the sense electrodes of the electrode unit and a drive electrode of an adjacent electrode unit. The extension portions may screen one or more of the drive electrodes of the electrode unit of which they form part of from a sense electrode of an adjacent electrode unit, thereby suppressing capacitive coupling between adjacent electrode units. The extensions portions may also be used to tune the electric field locally. If extension portions of this kind are provided, separate ground electrodes can be omitted, although they could be provided in combination.

In one embodiment, the tracks from the drive electrodes all connect to one longitudinal side of the touch-sensitive area. In another embodiment, some of the tracks from the drive electrodes connect to one longitudinal side of the touch-sensitive area and the other tracks connect to the other longitudinal side. This reduces the lateral extent occupied by the tracks, thereby reducing the lateral extent of the electrode unit.

The electrode pattern can allow for a small lateral extent of each electrode unit. Specifically, each electrode unit may have a longitudinal extent of no more than 15 mm, 14 mm, 13 mm, 12 mm, 11 mm, 10 mm, 9 mm, 8 mm, 7 mm, 6 mm, 5 mm, 4 mm or 3 mm. Preferably, each electrode unit may have a longitudinal extent of no more than 7 mm, 6 mm, 5 mm, 4 mm or 3 mm. The drive and sense electrodes may each have a lateral extent of no more than 2 mm, 1 mm or 0.5 mm. The coupling gap between each pair of drive and sense electrodes preferably each have a lateral extent of no more than 0.5 mm, 0.4 mm, 0.3 mm, 0.2 mm or 0.1 mm. The tracks extending from the periphery of the touch sensitive area to connect to respective ones of the drive electrodes preferably each have a lateral extent of no more than 0.5 mm, 0.4 mm, 0.3 mm, 0.2 mm or 0.1 mm. The compact lateral extent of the electrode units means that the number 'n' of such units may be larger than otherwise possible, for example at least 6, 7, 8, 9, 10, 11, 12, 13, 14, 15, 16, 17, 18, 19, or 20, for example. Moreover, the number of drive electrodes per electrode unit may be at least 4, 5, 6, 7, 8, 9, or 10, for example.

To enable multi-touch sensing the sensor would further comprise suitable processing elements, such as:

(a) a capacitance measurement circuit connected to the electrodes and operable repeatedly to acquire sets of capacitance signal values from the touch-sensitive area, each set being made up of a capacitance signal value from each pair of drive and sense electrodes, each pair constituting a sensing element; and (b) a processor connected to receive the sets of capacitance signal values and operable to process each set to compute and output coordinates of single or multiple touch locations on the touch-sensitive area, the processing of each set being performed by:

(i) identifying the sensing element having the largest capacitance signal value;

(ii) defining a region of the touch-sensitive area including said sensing element having the largest capacitance signal value and selected ones of its neighbors;

(iii) identifying and defining one or more further sensing elements and regions respectively, wherein each iteration excludes capacitance signal values from consideration if they lie in previously defined regions of the touch-sensitive area; and (iv) outputting data indicating the coordinates of the touch location in each region identified.

The first aspect of the invention can also manifest itself in a method of processing signals from a 2D touch-sensitive capacitive position sensor having a touch-sensitive area defined by a single-layer electrode pattern arranged on one side of a substrate, the electrode pattern having a lateral extent in a first direction and a longitudinal extent in a second direction transverse thereto and comprising a plurality of 'n' electrode units, where n is at least 3, extending row-wise over the touch-sensitive area longitudinally offset from one another, wherein the electrode units each comprise a drive electrode laterally extending across the touch-sensitive area and a plurality of 'm' sense electrodes, wherein m is at least 3, which collectively laterally extend across the touch-sensitive area and individually each occupy a portion of the lateral extent, the sense electrodes of each unit being longitudinally offset from the drive electrode so that one edge of each sense electrode lies adjacent to one edge of the drive electrode, these coupling edges being separated by a gap dimensioned so that in use each pair of drive and sense electrodes capacitively couple across the gap, wherein each pair of drive and sense electrodes constitutes a sensing element, the sensor further comprising a capacitance measurement circuit connected to the sensing elements and operable repeatedly to acquire sets of capacitance signal values, each set being made up of a capacitance signal value from each of the sensing elements; and a processor connected to receive the sets of capacitance signal values and operable to process each set to compute and output coordinates of single or multiple touch locations on the touch-sensitive area, the method of processing each set comprising:

(i) identifying the sensing element having the largest capacitance signal value;

(ii) defining a region of the touch panel including said sensing element having the largest capacitance signal value and selected ones of its neighbors;

(iii) identifying and defining one or more further sensing elements and regions respectively, wherein each iteration excludes capacitance signal values from consideration if they lie in previously defined regions of the touch panel; and (iv) outputting data indicating the coordinates of the touch location in each region identified.

The second aspect of the invention can also manifest itself in a method of processing signals from a 2D touch-sensitive capacitive position sensor having a touch-sensitive area defined by a single-layer electrode pattern arranged on one side of a substrate, the electrode pattern having a lateral extent in a first direction and a longitudinal extent in a second direction transverse thereto and comprising a plurality of 'n' electrode units, where n is at least 3, extending column-wise over the touch-sensitive area laterally offset from one another, wherein the electrode units each comprise a sense electrode longitudinally extending down the touch-sensitive area and a plurality of 'm' drive electrodes, wherein m is at least 3, which collectively longitudinally extend down the touch-sensitive area and individually each occupy a portion of the longitudinal extent, the drive electrodes of each unit being laterally offset from the sense electrode so that one edge of each drive electrode lies adjacent to one edge of the sense electrode, these coupling edges being separated by a gap dimensioned so that in use each pair of drive and sense electrodes capacitively couple across the gap, wherein each pair of drive and sense electrodes constitutes a sensing element, the sensor further comprising a capacitance measurement circuit connected to the sensing elements and operable repeatedly to acquire sets of capacitance signal values, each set being made up of a capacitance signal value from each of the sensing elements; and a processor connected to receive the sets of capacitance signal values and operable to process each set to compute and output coordinates of single or multiple touch locations on the touch-sensitive area, the method of processing each set comprising:

(i) identifying the sensing element having the largest capacitance signal value;

(ii) defining a region of the touch panel including said sensing element having the largest capacitance signal value and selected ones of its neighbors;

(iii) identifying and defining one or more further sensing elements and regions respectively, wherein each iteration excludes capacitance signal values from consideration if they lie in previously defined regions of the touch panel; and (iv) outputting data indicating the coordinates of the touch location in each region identified.

It is noted that the number of electrodes units 'n' could be at least 4 or 5 in a narrower definition of the invention.

BRIEF DESCRIPTION OF THE DRAWINGS

For a better understanding of the invention and to show how the same may be carried into effect reference is now made by way of example to the accompanying drawings.

FIG. 5 schematically shows a portable personal computer incorporating a sensor according to an embodiment of the invention;

FIG. 6 schematically shows a washing machine incorporating a sensor according to an embodiment of the invention;

FIG. 7 schematically shows a cellular telephone incorporating a sensor according to an embodiment of the invention;

DETAILED DESCRIPTION

Figure 1A:
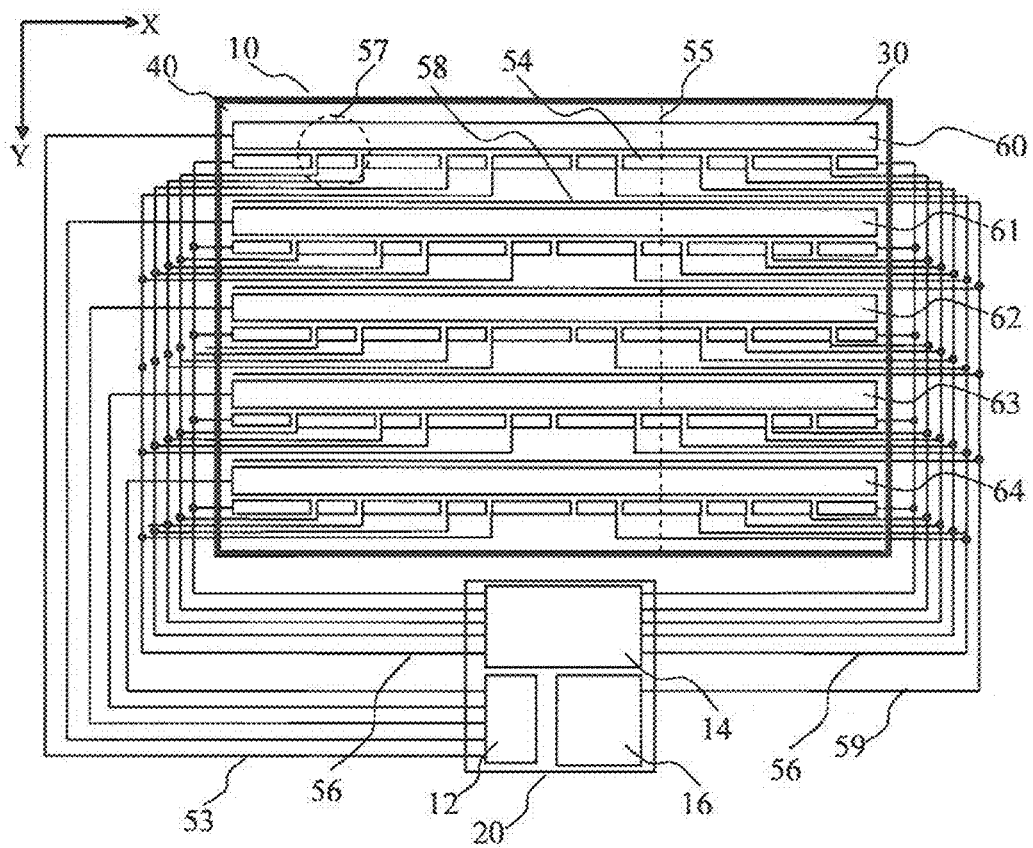
FIG. 1A shows a position sensor array according to an embodiment of the invention with drive and sense units connected via channels to a controller.

FIG. 1A is a view of a front side of a two dimensional position sensor array 10 according to an embodiment of the invention. The sensor extends in first and second directions, referred to as x- and y-directions respectively in the following. The convention is also adopted of referring to lateral and vertical, and lateral and longitudinal in respect of x- and y-directions and extents. The convention is also adopted of referring to left and right in respect of the x-direction as viewed in the figures. It will be appreciated that this labeling, while convenient, is arbitrary and has no underlying significance for the design.

The front side of the position sensor is typically the side facing the user during normal use of the sensor or an apparatus incorporating the sensor. The sensor 10 comprises a substrate 40 bearing an electrode pattern 30 defining a sensitive area of the sensor. Coupled to the position sensor array is a controller 20. The controller 20 is coupled to electrodes within the two dimensional position sensor array by a plurality of connections which will be described below. The electrode pattern is on one side of the substrate, typically on the underside, or back side, of the substrate opposite from the exposed front side available to receive user touches during normal use.

The two dimensional position sensor array 10 shown in FIG. 1A is a schematic representation of the invention that is not to scale. It will be appreciated that the controller 20 may be connected to the sensor array 10 via an edge connector for example. Furthermore, it will be appreciated that the routing of connections made between the electrode pattern 30 and an edge connector might be such that a single edge connector may be used.

The electrode pattern 30 on the substrate 40 can be provided using conventional techniques (e.g. lithography, deposition, or etch or deactivation techniques). The substrate is of a dielectric material such as a plastics film, in this case Polyethylene Terephthalate (PET). The electrodes comprising the electrode pattern are of a transparent conductive material, in this case Indium Tin Oxide (ITO). Alternatively, the electrodes could be formed from an opaque or very thin conductive material such as metal e.g. copper. The substrate may be bonded to an overlying panel (not shown) using a suitable pressure sensitive adhesive (PSA) which can be clear to allow light transmission. Thus the sensitive area of the sensor as a whole is transparent. If transparent, the sensor layer may be used over an underlying display without obscuration. In other embodiments, if the sensor layer is opaque, it may comprise a conventional printed circuit board or other substrate with a copper electrode pattern, e.g. for use in a mobile telephone keypad.

The controller 20 provides the functionality of a drive unit 12 for supplying drive signals to portions of the electrode pattern 30, a sense unit 14 for sensing signals from other portions of the electrode pattern 30, and a processing unit 16 for calculating a position based on the different sense signals seen for drive signals applied to different portions of the electrode pattern. The controller 20 thus controls the operation of the drive and sense units, and the processing of responses from the sense unit 14 in the processing unit 16, in order to determine the position of an object, e.g. a finger or stylus, adjacent the sensor 10. The drive unit 12, sense unit 14 and processing unit 16 are shown schematically in FIG. 1A as separate elements within the controller. However, in general the functionality of all these elements will be provided by a single integrated circuit chip, for example a suitably programmed general purpose microprocessor, field programmable gate array, application specific integrated circuit, especially in a microcontroller format.

Figure 8:
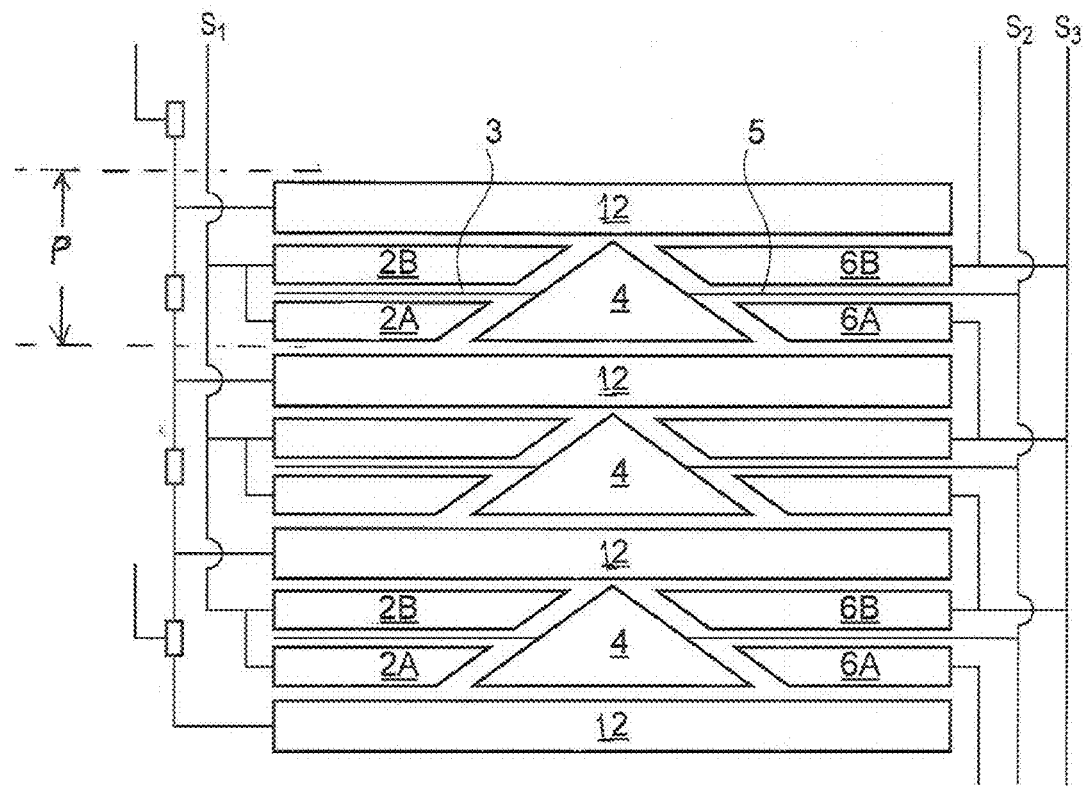
FIG. 8 illustrates schematically a representative portion of a prior art electrode pattern.

The processing unit will be operable to carry out suitable multi-touch processing of the data, for example according to either of the methods described in WO 2009/00704A1, namely the method described in connection with FIGS. 3 to 5 thereof and the second method described in connection with FIGS. 7 and 8 thereof, both of which groups of figures and accompanying descriptive text are incorporated herein by reference, namely page 13, line 30 to page 23, line 2 and page 28, line 22 to page 32, line 5 of the original filing. Here it is noted that what is referred to in this document as the processing unit is called the host controller in WO 2009/00704A1. Mulitouch processing using the processing unit 16 is described below for the two dimensional sensor array shown in FIG. 1A.

Referring to FIG. 1A, the electrodes 60, 61, 62, 63 and 64 are drive electrodes represented by longitudinal bars extending in an x-direction also referred to as a first direction, or laterally. That is to say that the drive electrodes extend along an axis in the x-direction. Each drive electrode is spaced apart by a plurality of sense electrodes 54 that extend in the x-direction. Each sense electrode is associated with a drive electrode such that each such drive/sense electrode pairing has an edge or side directly adjacent each other. Further, each sense electrode in a given row has the same longitudinal extent. This is possible, since unlike the prior art design described in the introduction, the sense electrodes of any given row do not coextend in the x-direction, but rather form discrete units occupying a unique range of extent in the x-direction. This also has the consequence that the electrode pattern does not include or require connecting tracks to be placed between the active edges of any of the drive/sense electrode pairing.

In the sensor array 10 shown in the figure, the sense electrodes in each row alternate between a wide bar and a narrow bar in the x-direction (laterally). In the sensor array shown in the figure the ratio of the widths of the wide and narrow sense electrodes is 2:1. However, it will be appreciated that a ratio of between 1:1 and 3:1 might be used, including non-integer ratios, for example 2.5:1. The sense electrodes also alternate between a wide and narrow bar in the y-direction (vertically or longitudinally). It will also be appreciate that the sense electrodes may not alternate between wide and narrows bars in the y-direction or vertically, only in the x-direction (laterally). A ratio of 1:1 may often be used.

FIG. 1A shows how the drive electrodes are coupled via drive channels 53 to the drive unit 12 of the controller 20. The drive channels typically connect to the drive electrode at the edge to reduce the spacing between the electrodes. The sense electrodes are shown with connections from the lower edge (in the y-direction) of the sense electrodes in the orientation shown. Connections or tracks are thus run from each sense electrode along the x-direction. In the example shown in the figure some of the connections go to the left and some go to the right. This is done to reduce the spacing between the electrodes in the y-direction. However, it will be appreciated that to reduce the complexity of connecting the sensor array 10 to the controller 20 all of the track connections might go to the left or to the right. It is noted that there are no tracks that split the drive/sense pairs along their principal coupling edge which has the effect of maximizing the capacitive coupling between paired drive and sense electrodes.

The position sensor array shown in FIG. 1A further comprises electrodes 58 interleaved between the drive electrodes and the connection track herein referred to as ground electrodes. Each of the ground electrodes 58 are connected using a common connection track 59. The connection track 59 is subsequently connected to the processing unit 16 of the controller 20. During operation the electrodes 58 are connected to a suitable ground connection by the processing unit 16. The ground connection provides a screening effect that suppresses coupling of the electric field from the drive electrodes to sense electrodes other than the ones it is paired with. In other words, each unit of one drive electrode and multiple sense electrodes is isolated from its adjacent unit or units.

In summary, the electrode pattern of the 2DCT is formed of a plurality of units (5 in the illustrated example), each unit comprising a single drive electrode and multiple sense electrodes (10 in the illustrated example). Moreover, each unit is separated by a ground electrode (4 in the illustrated example) to screen each unit from the adjacent unit or units.

In this example, a single drive unit with appropriate multiplexing is used so that all of the drive electrodes are driven by one drive circuit, although a separate drive unit for each drive channel may also be used. The sense electrodes are coupled together such that individual sense electrodes along a line in the y-direction, as indicated by the dotted line 55 are coupled together. Each group of sense electrodes of which there are ten in the example shown in FIG. 1A are connected via one of the sense or receive channels 56 to the sense unit 14 of the controller 20, as shown in FIG. 1A. The sense channels are also controlled by the controller 20 to receive signals from the respective sense electrodes.

The sensor 10 of the invention therefore comprises a plurality of driven electrodes and a plurality of sense electrodes comprising a network of interconnected electrodes across the sensitive area of the sensor. Each neighboring pairing of a drive element and a sense element (for example pair 57) may be considered to correspond to a discrete sensor area which may be operated according to the techniques described in U.S. Pat. No. 6,452,514, the contents of which are incorporated herein by reference. In use, the position of an object is determined in a measurement acquisition cycle in which the bar electrodes are sequentially driven by respective drive channels and the amount of charge transferred to the sense electrodes from each bar electrode is determined by the sense channels. In the following the term "event" will be used to describe the act of applying a drive pulse or set of pulses to a drive electrode and then sensing the charge transferred to the paired sense electrodes.

The x position of the touch or other actuation is obtained by ratiometric interpolation of the signal strength of two adjacent sense electrodes in the x-direction with the highest signal. Once the full set of sense signals is collected from driving the five drive electrodes the two adjacent events that yielded the strongest signals are selected, and the x-position determined by ratiometric interpolation of the signal strength of these two signals.

The y position of the touch or other actuation is also obtained by ratiometric interpolation of the signal strength. Once the full set of sense signals are collected from driving the five drive electrodes, the two adjacent drive events that yielded the strongest signals are selected, and the y position determined by ratiometric interpolation of the signal strength of these two signals. For example, if the strongest pair of adjacent signals is obtained from the driving of electrodes 61 and 62, and the signal obtained when driving electrode 62 is two times greater than the signal obtained when driving electrode 63, then the touch is determined to have taken place ⅓ of the way from the drive electrode 62 towards the drive electrode 63.

It will be appreciated that alternative interpolation methods may be used and the method described above is only one method that may be used to interpolate the x and y position of any touches or objects adjacent the two dimensional touch sensor. A further interpolation method is described below.

The layout and function of the two dimensional position sensor array 10 and accompanying processor 20 shown in FIG. 1A has been described. Now FIGS. 1B to 1K are used to describe the method which the processor 20 is used to determine touch positions on the 2D two dimensional position sensor array 10.

Figure 1B:
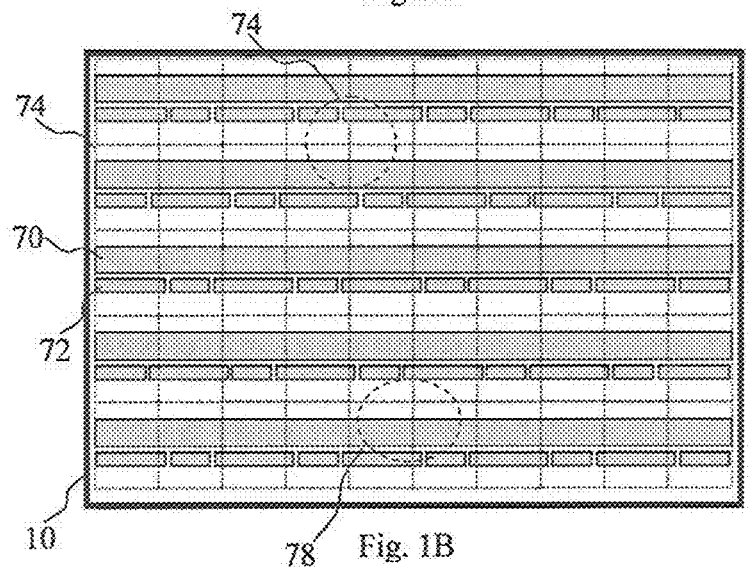
FIG. 1B shows the position sensor array according to an embodiment of the invention divided into discrete sensor areas.

FIG. 1B shows the two dimensional position sensor array 10 shown in FIG. 1A with the processor and connecting wires removed. This is done to more easily illustrate how the position of any touches adjacent the sensor array 10 may be determined. In the figure the drive and sense electrodes 70, 72 are shaded in grey. The sensor array 10 has been divided into a number of discrete sensor region or sensing element, each comprising a sense electrode 72 adjacent one of the drive electrodes 70. The discrete sensor regions are shown in the figure by a dotted rectangle 74. An array of 10×5 discrete regions is shown in the figure. The discrete regions are herein referred to as keys or discrete keys. Also shown in the figure are two touches represented by dotted circles 76, 78. The processing or method that may be used to determine the location of the two touches adjacent the two dimensional sensor array will be described below.

Figure 1C:
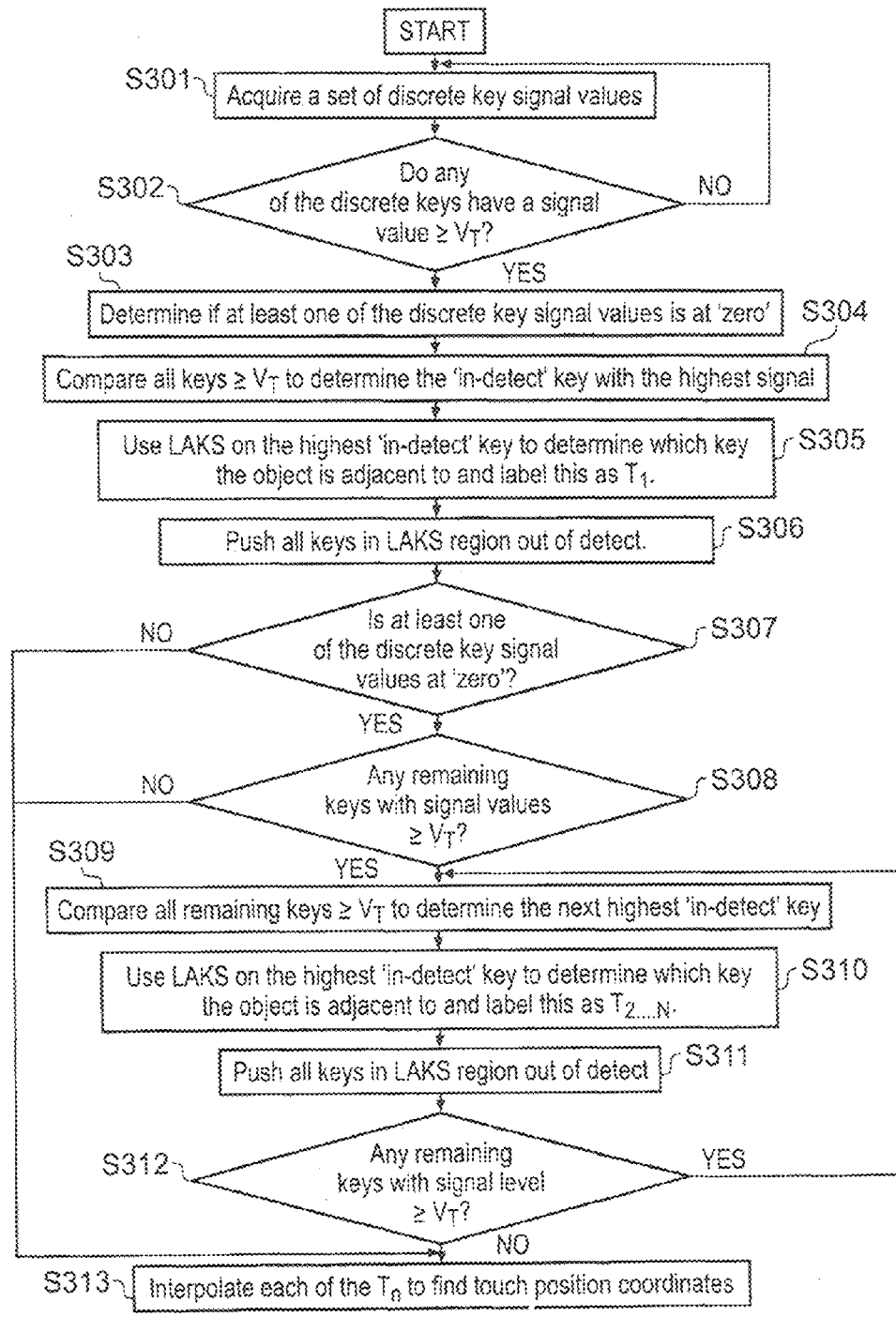
FIG. 1C is a flow chart of the signal processing method of the first embodiment.

FIG. 1C is a flow diagram showing steps of the signal processing method embodied in hardware, firmware or software in the controller 20 containing the processing unit 16. FIGS. 1D to 1K show the 10×5 array of discrete keys of the two dimensional position sensor array 10 in sequence at various points in the processing for an example set of touch inputs.

Figure 1D:
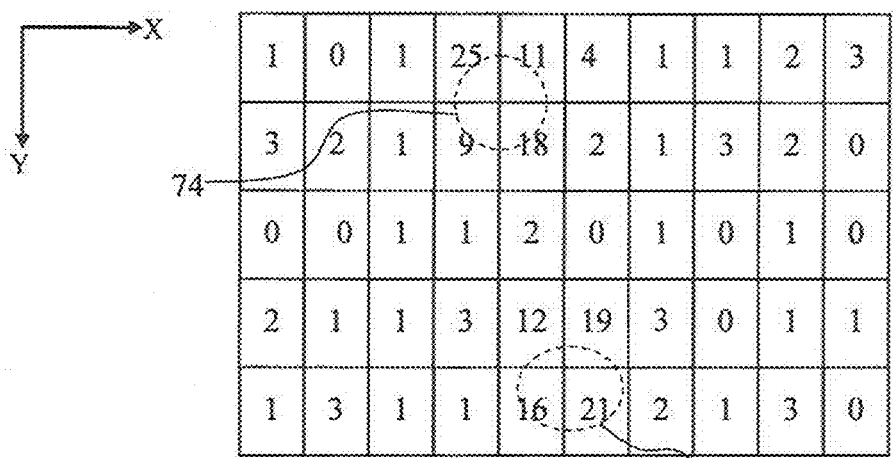
FIGS. 1D to 1K are a sequence of schematic views of the sensor array used to describe a specific example of the signal processing method shown in the flow chart of FIG. 1C.

FIG. 1D shows a 10×5 grid with the raw data values of the signals acquired in a single acquisition in Step S301 of FIG. 1C. The acquisition of the signals is carried in the manner described above. Each of the grid squares represents one of the discrete keys of the two dimensional position sensor array 10. The two simultaneous finger touches shown in FIG. 1B are also illustrated in FIG. 1D indicated by dashed lines 76, 78. The raw data values are stated in arbitrary units. There is one finger touch near the top centre of the panel and another finger touch near the bottom centre of the panel.

Figure 1E:
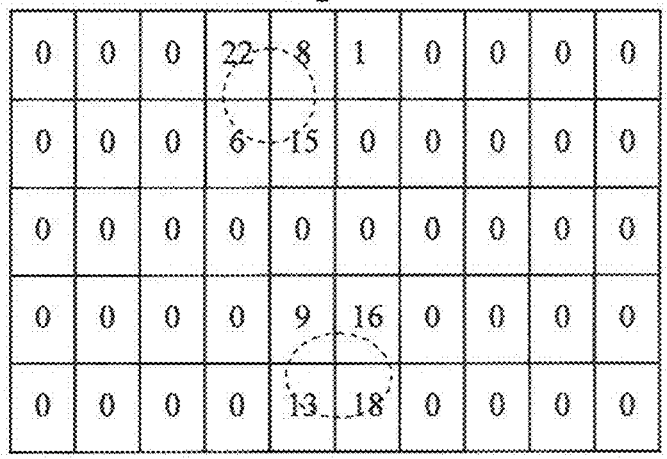

FIG. 1E shows the signal values after a pre-processing step of subtracting a background signal value $V_B$ from the raw signal values. In this example, the background signal has a value $V_B=3$. In this example, the threshold signal value after background signal level subtraction is taken to be $V_t=12$.

Figure 1F:
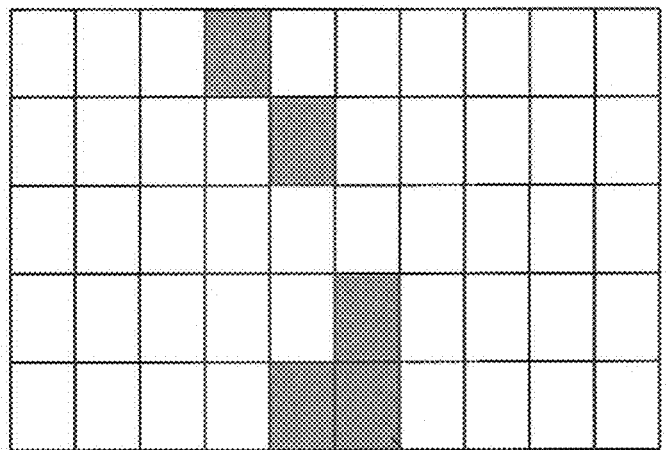
Figure 1G:
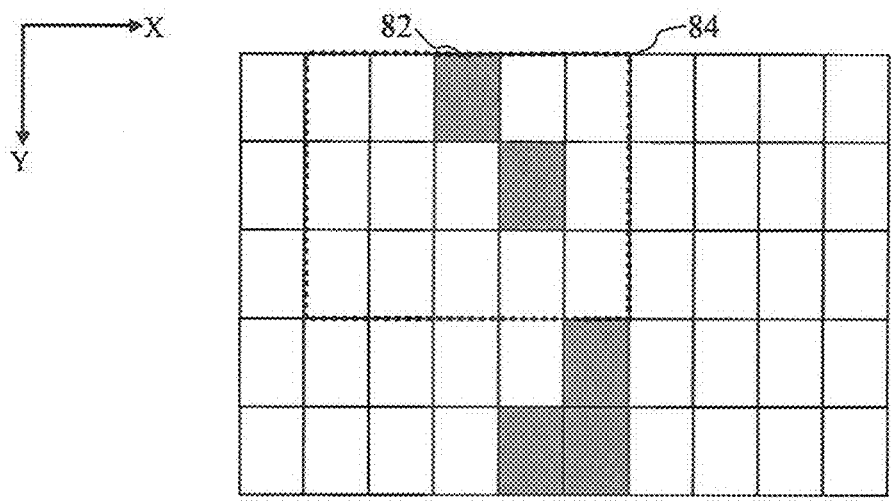

FIG. 1F shows as shaded panels the positions of the discrete keys that have returned signals above the threshold, i.e. the in-detect keys. Each of the discrete keys is denoted by K(a,b), where 'a' is the column position, starting from '1' on the left of the grid and where 'b' is the row position, starting from '1' at the top of the grid (i.e. the shaded element 80 in FIG. 1E is K(4,1)). The location of the in-detect keys is K(4,1), K(5,2), K(6,4), K(5,5) and K(6,5).

It will be appreciated that the acquisition time may be fixed or variable. A fixed acquisition time would be set by the processing unit. An example of a variable acquisition time would be when charge accumulation is terminated for the whole panel when one of the sense channel has accumulated to a certain threshold which may be a multiple of the in-detect threshold, for example twice the in-detect threshold.

In Step S301, the signal values of each of the discrete keys are acquired by the processing unit 16, which are indicative of an applied capacitive load to two dimensional position sensor array 10.

In Step S302, it is determined whether there are any signals above threshold. If none of the signals acquired from the processing unit 16 is in-detect, the algorithm returns to Step S301 and acquires a new set of discrete key signal values. This will continue until either at least one of the discrete key signal value is greater than or equal to Vt or the loop is terminated by an appropriate control signal. It will be appreciated that the time interval between signal acquisitions may be increased with time if no above-threshold signals are received in order to save power. Another option is for the touch panel device to deactivate completely after a certain period of no signals being received above threshold, requiring a separate control input to reactivate, i.e. enter a sleep mode.

In Step 303, it is tested whether there is at least one signal at or below the background level in the acquired set of signals. To achieve this criterion there must be at least one of the discrete key signal values which is less than or equal to the predetermined background level signal, or 'zero' signal. The zero signal value is representative of the background signal level when no object is adjacent to two dimensional position sensor array 10. Each of the discrete key signal values of two dimensional position sensor array 10 is compared with the predetermined zero signal value in Step S303. The result of this test is used to make a decision later in the process flow.

In Step S304, all of the in-detect signal values are compared to one another to find the key with the highest signal value.

Figure 1H:
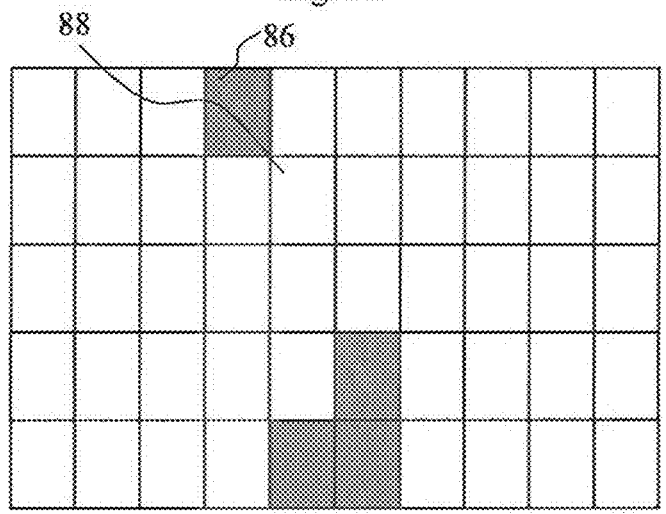

FIG. 1H shows the highest in-detect signal value is that of the discrete key at location K(4,1) 82. To find the location of the object at or near the discrete key at location K(4,1) 82 (i.e. the highest in-detect discrete key signal value) a modified implementation of Adjacent Key Suppression (AKS) is used. Conventional AKS is described in U.S. Pat. No. 6,993,607. The modified AKS method used here is referred to as localised AKS (LAKS) in the following. In conventional AKS, all keys are included in the analysis. However, in the present version of AKS, an iterative approach is used to the sensor array in which AKS is applied locally to a succession of sub-blocks or regions of the sensor array. The position of each sub-block is defined in relation to a selected in-detect element, and includes nearest neighbour and next nearest neighbour elements, i.e. discrete key positions immediately adjacent to the selected in-detect position and the discrete key positions that are adjacent to the immediately adjacent ones. The boundary within which the LAKS algorithm is performed in the present example is illustrated in the figure by the dashed boundary 84. The size of the sub-block for this example is limited by the size of the sensor array. However, if the sensor array contained more discrete keys the sub-block would be greater in size, in accordance with the definition above.

In Step S305, AKS is applied within the sub-block of keys defined by the boundary 84 to determine which of the keys in the sub-block is the one that should be associated with the touch, i.e. adjacent the object. It is noted that this will often be the key with the highest signal value, but this is not necessarily the case. An example of a situation where a different key might be selected is a situation where the AKS method takes account of the handshadow effect as described in EP 1335318A1. For example, if a vertical line of keys is in-detect, the key output by the AKS method will be the topmost key even if that key is not the key with the highest signal value. In the illustrated example, AKS determines that the discrete key at location K(4,1) is the key which is adjacent to the touch, this key also being the key with the highest signal. This selected key is labelled T1.

In Step S306, the other 'in-detect' key K(5,2) lying within the boundary 84 of the LAKS sub-block (i.e. the dashed line) is now ignored in subsequent steps of the method specific to LAKS, i.e. its signal is suppressed from subsequent LAKS steps. It may thus be considered to have been "pushed out" of detect.

FIG. 1H shows the key with the selected key 86 labelled as T1 with the boundary 84 of the LAKS sub-block (i.e. the dashed line). The key that is "pushed out" of detect is also illustrated in FIG. 1H by the "unshading" of the grid square at K(5,2) 88. Although any in-detect keys that are pushed out of detect by the LAKS are no longer included in this part of the detection algorithm, they may be included in a later part of the method, as will be understood further below.

In Step S307, if it was determined in Step S303 that there is no key with a zero signal, then process flow jumps to Step S313. This jump rules out the possibility of detecting further touches, on the basis that if there is no key with zero signal, then there is no reliable minimum, and hence multiple touches cannot be reliably distinguished from a situation where there is a single touch over a large area, perhaps over the whole panel. On the other hand, if it was determined in Step S303 that there is at least one key above the background level, then the process flow passes to Step S308, since there remains the possibility of being able to reliably resolve multiple touches.

In Step S308, the signal values of the remaining discrete keys are compared to the threshold value Vt. If none of the remaining key signals is greater than or equal to the threshold value Vt, then the process flow jumps to Step S313. On the other hand, if there are in-detect array keys with a signal value greater than or equal to the threshold value Vt, then the LAKS process is repeated, based on the key with the next highest signal value.

Figure 1I:
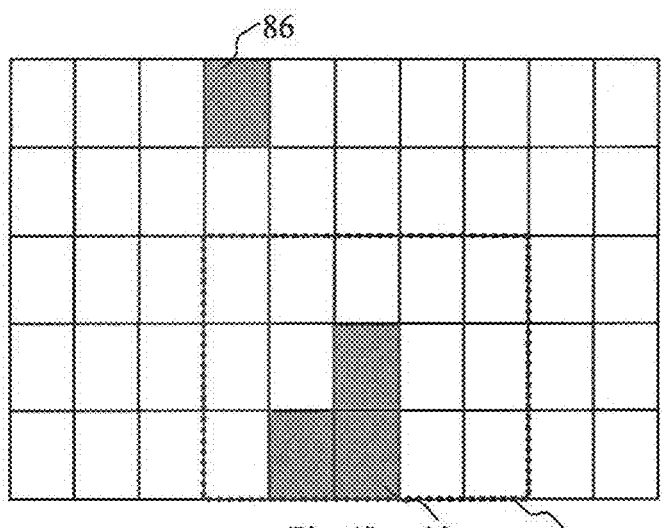

FIG. 1I shows the remaining in-detect discrete key signal values at locations K(5,5), K(6,5) and K(6,4).

In Step S309, the signal values from the remaining in-detect keys are compared with one another to find the highest. The highest signal value is at discrete key location K(6,5) 90.

In Step S310, LAKS is carried out on the discrete keys lying in the LAKS sub-block formed around key K(6,5), i.e. the keys contained within the boundary shown in FIG. 1I within the dashed line boundary 92. The LAKS region includes all of the keys situated within the dashed line boundary 92. The LAKS processing decides which of the keys in the sub-block is the one most likely to be closest to the touch. In the following we assume that the discrete key at location K(6,5) 90 is the one selected by the AKS. This key 90 is labelled T2 as it is the key selected in the second iteration of the LAKS processing.

Figure 1J:
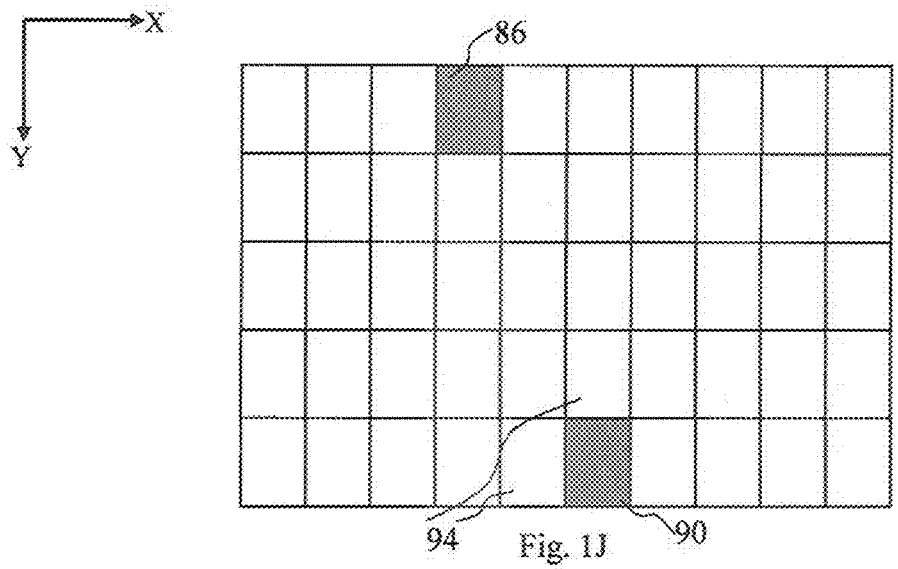

In Step S311, all of the other in-detect keys within the boundary defined by the LAKS (i.e. the dashed line 92) are pushed out of detect as shown in FIG. 1*j* by the now unshaded discrete locations K(5,5) and K(6,4) 94.

In Step S312, any remaining discrete key signal values are compared to the threshold value Vt. If none of the remaining key signals are greater than or equal to the threshold value Vt (as in the illustrated example), then Step S313 of the algorithm is executed. However, if there are any keys remaining with above-threshold signal values, the algorithm is repeated from Step S309 to S312 to assign a further discrete key T3. This process is repeated until Step S312 returns a null value.

At this point in the process, the LAKS processing is finished, and the process moves to a further stage, namely Step S313.

In Step S313, the coordinates of each of the touches T1, T2 . . . TN is determined, where N may be one (a single touch) or more than one (multiple touches). The coordinates of each touch are determined using an interpolation method. The interpolation has access to all the signal values, whether above or below threshold. In other words, the signal values from any of the keys that were suppressed during the LAKS processing are used if required. In the example, the signal values available for the interpolation are the signal values shown in FIG. 1E, i.e. the raw signal values after background subtraction. For each touch Tn, the method interpolates using the signal values from the key Tn and its adjacent keys. There are various possible interpolation methods that can be used, but we describe only one in the following.

Two different equations are used to compute the x- and y-coordinates of the assigned touches. These are Equation 1 and Equation 2, show below. The terms in both of these equations have the following definition. 'Max' is the signal value of the discrete keys defined as T1 . . . Tn. 'Mid' is the signal value of the discrete key with the highest signal value that is adjacent to 'Max'. 'Min' is the 'zero' signal value which was defined previously. $P_0$ is an offset which corresponds to the centre of each sensing element. The values for $P_0$ for the x-direction and the y-direction are shown on FIG. 1K along the top and side of the sensor array. Q is a number, representing a number of predefined discrete positions within each the discrete keys.

Equation 1 is used when the 'Mid' signal value is to the left of or below the 'Max' signal value. Equation 2 is used when the 'Mid' signal value is to the right of or above the 'Max' signal value.

$$P = P_0 + Q\left(\frac{\text{Max} - \text{Min}}{\text{Max} + \text{Mid} - 2\text{Min}}\right) \quad \text{(Equation 1)}$$

$$P = P_0 + Q - Q\left(\frac{\text{Max} - \text{Min}}{\text{Max} + \text{Mid} - 2\text{Min}}\right) \quad \text{(Equation 2)}$$

The procedure used for interpolating the position of the first assigned touch, T1 is as follows. To interpolate the x- and y-coordinate of T1 86, Equation 2 will be used because the 'Mid' signal value is to the right of the 'Max' signal value in the case of the x-coordinate and the 'Mid' signal value is to the above of the 'Max' signal value in the case of the y-coordinate.

FIG. 1E shows the signal values from the discrete keys after the background signal level $V_B$($V_B$=3) has been subtracted. The signal values in FIG. 1E will be used to find the x- and y-coordinates of T1 86 (discrete key location K(4,1)). The following discrete key signal values are used to find the x-coordinate of the two dimensional sensor array 10. The 'Max' value is equal to the signal value of the discrete key at location K(4,1), Max=22. The 'Mid' value is equal to the signal value of the discrete key at location K(5,1), Mid=8. The 'Min' value is equal to the signal value of the discrete key at location K(3,1), Min=0. In the example of T1 each of the discrete keys is separated into 10 (Q=10) discrete positions. In the example of T1, $P_0$=30 because the detected touch is to the right of the first x-conducting line X1. The calculated x-coordinate for T1 is '2.6 '. This is now repeated to find the y-coordinate of the detected touch adjacent the two dimensional sensor array 10.

The following signal values of the discrete keys are used to find the y-coordinate of the two dimensional sensor array 10. The 'Max' value is equal to the signal value of the discrete key at location K(4,1), Max=22. The 'Mid' value is equal to the signal value of the discrete key at location K(4,2), Mid=6. The 'Min' value is equal to the signal value of the discrete key at location K(4,3), Min=0. In the example of T1 each of the discrete keys is separated into 10 (Q=10) discrete positions. In the example of T1, $P_0$=0 because the detected touch is below the first y-conducting line Y1. The calculated y-coordinate for T1 is '2.1 '. Therefore the coordinates of the assigned touch T1 are (32.6, 2.1) or (33, 2) when rounded to the nearest integer value of Q.

The remaining touch position T2, shown in FIG. 1*j* is computed using the interpolation method described above. However, Equation 1 is used because the 'Mid' signal value for the x-coordinate is to the left of the 'Max' signal value and the 'Mid' signal value for the y-coordinate is above the 'Max' signal value. The computed coordinates for the assigned touch T2 are (56, 35) when rounded to the nearest integer value of Q.

Figure 1K:
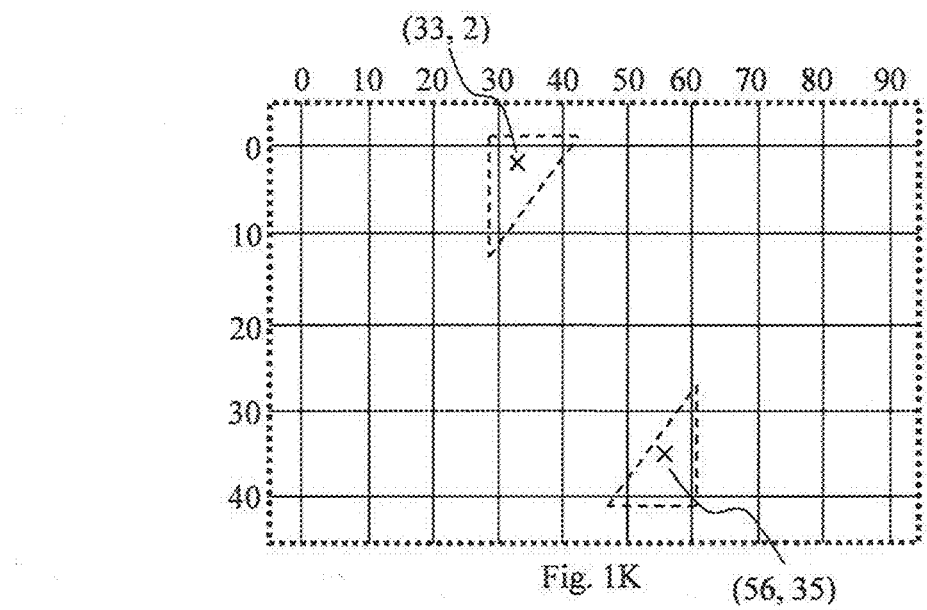

FIG. 1K shows the interpolated position of the two touches, T1 and T2, on the sensor array 10. In this example the position sensor has been divided into 360 possible positions.

Alternative interpolation methods may incorporate weighting factors, for example with the adjacent keys having a lower weighting than the keys Tn. Another example might be to weight according to expected hand shadow effects. Interpolation need not be done in a row-wise and column-wise manner as described above. For example, interpolation could be among all nearest neighbour keys, or all keys in the LAKS sub-block region previously defined for the key Tn. Many other variations of interpolation methods will be envisaged.

Figure 1L:
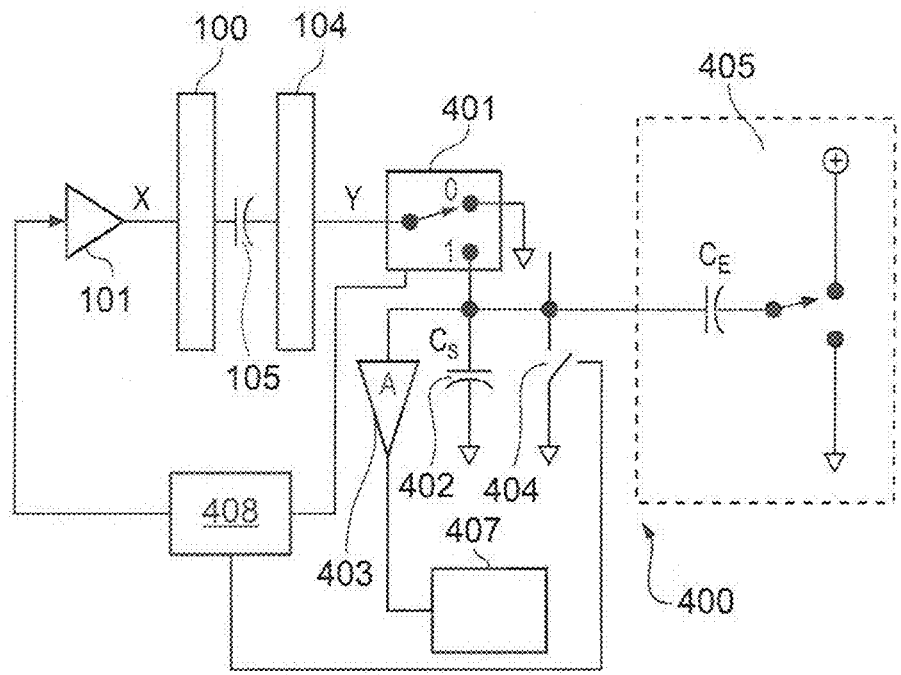
FIG. 1L schematically shows a circuit which may be used to measure the charge transferred from a driven one of the drive electrodes to the sense electrodes.
Figure 1M:
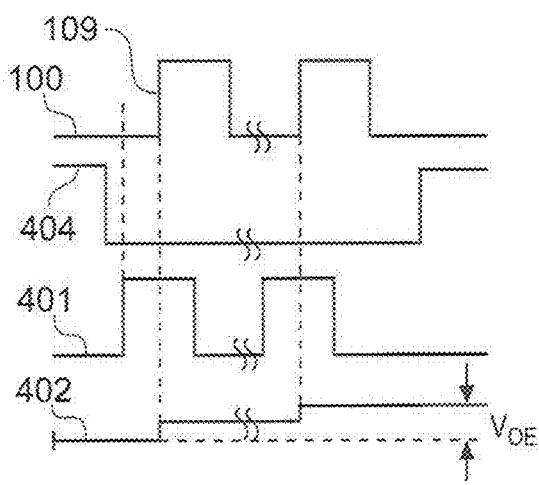
FIG. 1M shows schematically the timing relationships of operation of the circuit of FIG. 1L.

FIG. 1L schematically shows a circuit which may be used to measure the charge transferred from a driven one of the drive electrodes to the sense electrodes, the drive electrode being driven at a given time and the sense electrode have a self capacitance. This is determined primarily by their geometries, particularly in the regions where they are at their closest. Thus the driven drive electrode is schematically shown as a first plate 100 of a capacitor 105 and the sense electrode is schematically shown as a second plate 104 of the capacitor 105. Circuitry of the type shown in FIG. 1M is more fully described in U.S. Pat. No. 6,452,514. The circuit is based in part on the charge-transfer ("QT") apparatus and methods disclosed in U.S. Pat. No. 5,730,165, the contents of which are incorporated herein by reference.

As noted above the example shown in FIG. 1A comprises a single circuit that is switched between each of the drive and sense electrodes using appropriate de-multiplexing and multiplexing techniques respectively.

The drive channel associated with the presently driven electrode 100, the sense channel associated with sense electrode 104 and elements of the sensor controller are shown as combined processing circuitry 400 in FIG. 1L. The processing circuitry 400 comprises a sampling switch 401, a charge integrator 402 (shown here as a simple capacitor), an amplifier 403 and a reset switch 404, and may also comprise optional charge cancellation means 405.

FIG. 1M shows schematically the timing relationships between the driven electrode drive signal from the drive channel 101 and the sample timing of switch 401. The drive channel 101 and the sampling switch 401 are provided with a suitable synchronizing means, which may be a microprocessor or other digital controller 408, to maintain this relationship. In the implementation shown, the reset switch 404 is initially closed in order to reset the charge integrator 402 to a known initial state (e.g., zero volts). The reset switch 404 is then opened, and at some time thereafter the sampling switch 401 is connected to charge integrator 402 via terminal 1 of the switch for an interval during which the drive channel 101 emits a positive transition, and thereafter reconnects to terminal 0, which is an electrical ground or other suitable reference potential. The drive channel 101 then returns to ground, and the process repeats again for a total of 'n' cycles, (where n may be 1 (i.e. 0 repeats), 2 (1 repeat), 3 (2 repeats) and so on). It can be helpful if the drive signal does not return to ground before the charge integrator is disconnected from the sense electrode since otherwise an equal and opposite charge would flow into/out of the sense channel during positive and negative going edges, thus leading to no net transfer of charge into the charge detector. Following the desired number of cycles, the sampling switch 401 is held at position 0 while the voltage on the charge integrator 402 is measured by a measurement means 407, which may comprise an amplifier, ADC or other circuitry as may be appropriate to the application at hand. After the measurement is taken, the reset switch 404 is closed again, and the cycle is restarted, though with the next drive channel and driven electrode in sequence replacing the drive channel 101 and driven electrode 100 schematically shown in FIG. 1L. The process of making a measurement for a given driven electrode is referred to here as being a measurement 'burst' of length 'n' where 'n' can range from 1 to any finite number. The circuit's sensitivity is directly related to 'n' and inversely to the value of the charge integrator 402.

It will be understood that the circuit element designated as 402 provides a charge integration function that may also be accomplished by other means, and that this type of circuit is not limited to the use of a ground-referenced capacitor as shown by 402. It should also be self-evident that the charge integrator 402 can be an operational amplifier based integrator to integrate the charge flowing through in the sense circuitry. Such integrators also use capacitors to store the charge. It may be noted that although integrators add circuit complexity they provide a more ideal summing-junction load for the sense currents and more dynamic range. If a slow speed integrator is employed, it may be necessary to use a separate capacitor in the position of 402 to temporarily store the charge at high speed until the integrator can absorb it in due time, but the value of such a capacitor becomes relatively non-critical compared to the value of the integration capacitor incorporated into the operational amplifier based integrator.

It can be helpful for the sampling switch 401 to connect the sense electrode of the sensor to ground when not connected to the charge integrator 402 during the changes of drive signal of the chosen polarity (in this case positive going). This is because this can create an artificial ground plane, thus reducing RF emissions, and also, as noted above, permitting the coupled charge of opposite polarity to that being sensed by the charge integrator 402 to properly dissipate and neutralize. It is also possible to use a resistor to ground on the sense electrode to accomplish the same effect between transitions of drive channels 101. As an alternative to a single-pole double-throw (SPDT) switch 401, two independent switches can be used if timed in an appropriate manner.

As described in U.S. Pat. No. 5,730,165, there are many signal processing options possible for the manipulation and determination of a detection or measurement of signal amplitude. U.S. Pat. No. 5,730,165 also describes the gain relationship of the arrangement depicted in FIG. 1L, albeit in terms of a single electrode system. The gain relationship in the present case is the same. The utility of a signal cancellation means 405 is described in U.S. Pat. No. 4,879,461, as well as in U.S. Pat. No. 5,730,165. The disclosure of U.S. Pat. No. 4,879,461 is herein incorporated by reference. The purpose of signal cancellation is to reduce the voltage (i.e. charge) build-up on the charge integrator 402 concurrently with the generation of each burst (positive going transition of the drive channel), so as to permit a higher coupling between the driven electrodes and the receiving sense electrodes. One benefit of this approach is to allow a large sensing area that is sensitive to small deviations in coupling between the electrodes at relatively low cost. Such large sense couplings are present in physically relatively large electrodes such as might be used in human touch sensing pads. Charge cancellation permits measurement of the amount of coupling with greater linearity, because linearity is dependent on the ability of the coupled charge from the driven electrode 100 to the sense electrode 104 to be sunk into a 'virtual ground' node over the course of a burst. If the voltage on the charge integrator 402 were allowed to rise appreciably during the course of a burst, the voltage would rise in inverse exponential fashion. This exponential component has a deleterious effect on linearity and hence on available dynamic range.

The drive channel may be a simple CMOS logic gate powered from a conventionally regulated supply and controlled by the sensor controller 20 to provide a periodic plurality of voltage pulses of a selected duration (or in a simple implementation a single transition from low-to-high or high-to-low voltage, i.e. a burst of one pulse). Alternatively, the drive channel may comprise a sinusoidal generator or generator of a cyclical voltage having another suitable waveform. A changing electric field is thus generated on the rising and failing edges of the train of voltage cycles applied to the driven electrode. The driven electrode and the sense electrode are assumed to act as opposing plates of a capacitor having a capacitance $C_E$. Because the sense electrode is capacitively coupled to the driven electrode, it receives or sinks the changing electric field generated by the driven column electrode. This results in a current flow in the sense electrode induced by the changing voltage on the driven electrode through capacitive differentiation of the changing electric fields. The current will flow towards (or from, depending on polarity) the sense channels in the sense unit 14. As noted above, the sense channel may comprise a charge measurement circuit configured to measure the flow of charge into/out of (depending on polarity) the sense channel caused by the currents induced in the sense electrode.

The capacitive differentiation occurs through the equation governing current flow through a capacitor, namely:

$$I_E = C_E \times \frac{dV}{dt}$$

where $I_E$ is the instantaneous current flowing to a sense channel and dV/dt is the rate of change of voltage applies to a driven electrode. The amount of charge coupled to the sense electrode (and so into/out of the sense channel) during an edge transition is the integral of the above equation over time, i.e.

$$Q_E = C_E \times V.$$

The charge coupled on each transition, $Q_E$, is independent of the rise time of V (i.e. dV/dt) and depends only on the voltage swing at the driven electrode (which may readily be fixed) and the magnitude of the coupling capacitance $C_E$ between the driven electrode and sense electrode. Thus a determination of the charge coupled into/out of charge detector comprising the sense channel in response to changes in the drive signal applied to the driven electrode is a measure of the coupling capacitance $C_E$ between the driven electrode and the sense electrode.

The capacitance of a conventional parallel plate capacitor is almost independent of the electrical properties of the region outside of the space between the plates (at least for plates that are large in extent compared to their separation). However, for a capacitor comprising neighboring electrodes in a plane this is not the case. This is because at least some of the electric fields connecting between the driven electrode and the sense electrode "spill" out from the substrate. This means the capacitive coupling (i.e. the magnitude of $C_E$) between the driven electrode and the sense electrode is to some extent sensitive to the electrical properties of the region in the vicinity of the electrodes in to which the "spilled" electric field extends.

In the absence of any adjacent objects, the magnitude of $C_E$ is determined primarily by the geometry of the electrodes, and the thickness and dielectric constant of the sensor substrate. However, if an object is present in the region into which the electric field spills outside of the substrate, the electric field in this region may be modified by the electrical properties of the object. This causes the capacitive coupling between the electrodes to change, and thus the measured charge coupled into/from the charge detector comprising the sense channel(s) changes. For example, if a user places a finger in the region of space occupied by some of the of the spilled electric fields, the capacitive coupling of charge between the electrodes will be reduced because the user will have a substantial capacitance to ground (or other nearby structures whose path will complete to the ground reference potential of the circuitry controlling the sense elements). This reduced coupling occurs because the spilled electric field which is normally coupled between the driven electrode and sense electrode is in part diverted away from the electrode to earth. This is because the object adjacent the sensor acts to shunt electric fields away from the direct coupling between the electrodes.

Thus by monitoring the amount of charge coupled between the driven electrode and the sense electrode, changes in the amount of charge coupled between them can be identified and used to determine if an object is adjacent the sensor (i.e. whether the electrical properties of the region into which the spilled electric fields extend have changed).

Figure 2:
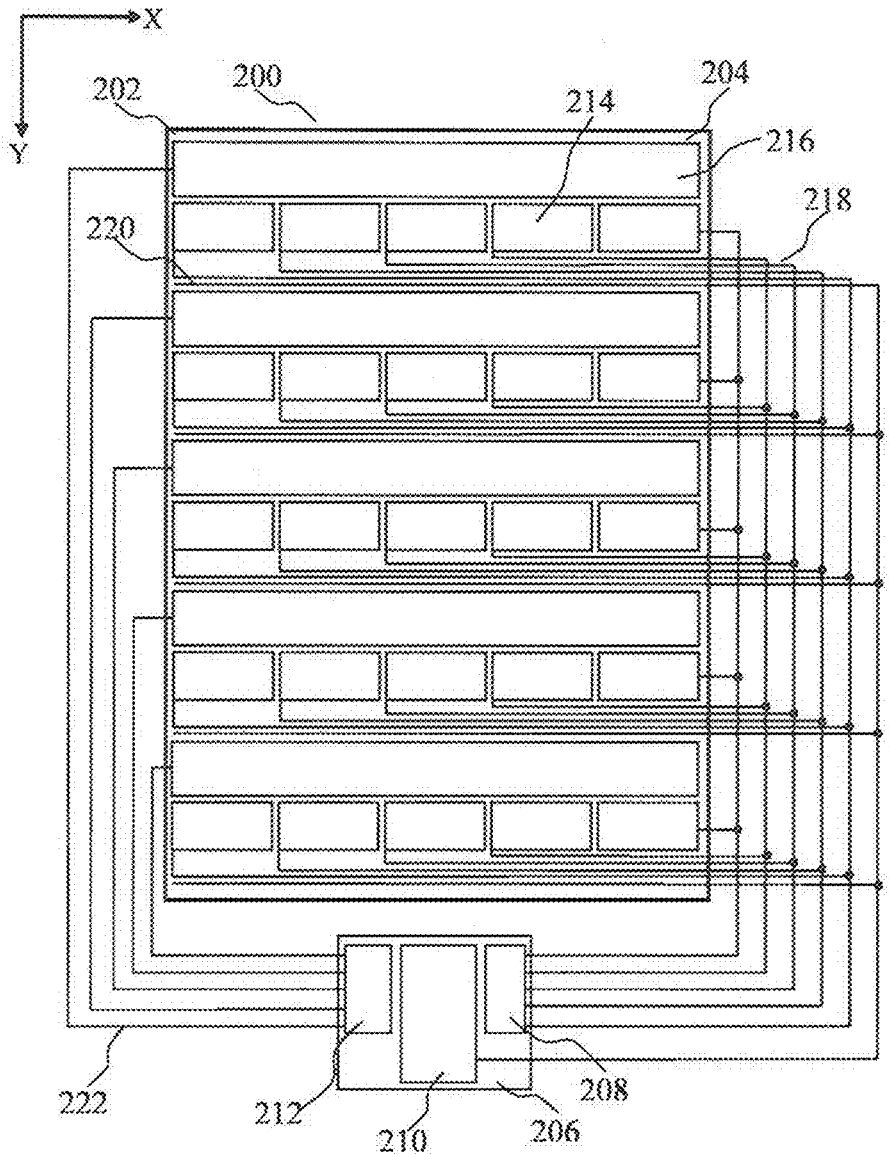
FIG. 2 shows a position sensor array according to another embodiment of the invention with drive and sense units connected via channels to a controller.

FIG. 2 is a view of a front side of a two dimensional position sensor array 200 according to another embodiment of the invention. The two dimensional position sensor 200 shown in FIG. 2 is similar in construction and operation to the two dimensional position sensor array 10 shown in FIG. 1A. The sensor 200 comprises a substrate 202 bearing an electrode pattern 204 defining a sensitive area of the sensor. Coupled to the position sensor array is a controller 206. The controller 206 is coupled to electrodes within the two dimensional position sensor array by a plurality of connections which will be described below. The controller 206 provides the functionality of a drive unit 212 for supplying drive signals to portions of the electrode pattern 204, a sense unit 208 for sensing signals from other portions of the electrode pattern 204, and a processing unit 210 for calculating a position based on the different sense signals seen for drive signals applied to different portions of the electrode pattern. The controller 206 thus controls the operation of the drive and sense units, and the processing of responses from the sense unit 208 in the processing unit 210, in order to determine the position of an object, e.g. a finger or stylus, adjacent the sensor 200.

Referring to FIG. 2, the electrodes 216 are drive electrodes represented by five longitudinal bars extending in the x-direction. That is to say that the drive electrodes extend along an axis in the x-direction. Adjacent drive electrodes are spaced apart by a plurality of five sense electrodes 214 extending in the x-direction. In the sense array 200 shown in the figure the sense electrodes are the same width. As shown in the figure there is also a plurality of sense electrodes extending in the x-direction adjacent the final drive electrode in the y-direction. Furthermore, connections or tracks 218 all run from the sense electrodes along the x-direction, to the right in the figure. This is done to reduce the complexity of connecting the controller 206 to the sense electrodes 214. In other words, all of the connections can be made using a single connection. Alternatively, track connections could go to the left and to the right to reduce the spacing between the drive and sense electrodes 216, 214. Similar tracks or connections 222 are run from the drive electrodes 216 to the drive unit 212. The position sensor array 200 shown in FIG. 2 further comprises a plurality of electrodes 220 interleaved between the drive electrodes and the connection track herein referred to as ground electrodes.

Figure 3:
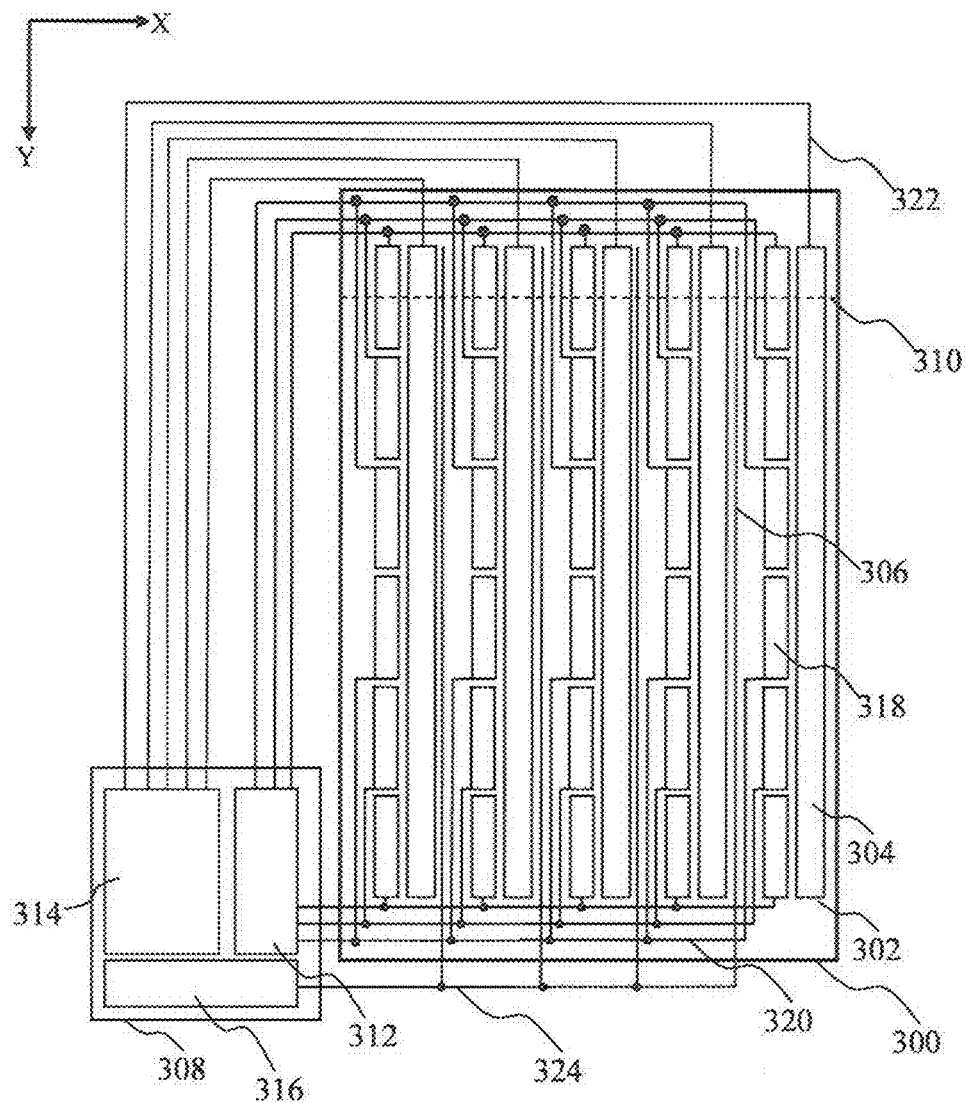
FIG. 3 shows a position sensor array according to another embodiment of the invention with drive and sense units connected via channels to a controller.

FIG. 3 is a view of a front side of a two dimensional position sensor array 300 according to another embodiment of the invention. The two dimensional position sensor array 300 shown in FIG. 3 is similar in construction and operation to the two dimensional position sensor array 10 shown in FIG. 1A. However, the electrode pattern 302 has been rotated through 90 degrees such that the operation of the drive and sense electrodes is now reversed. In others words the continuous bar electrodes 304 that extend in the y-direction are now used as sense electrodes and the plurality of electrodes 318 that are interleaved with the continuous bar electrodes 304 are used as drive electrodes. The drive electrodes 306 that are on the same line, for example dotted line 310 in the x-direction are all connected together, such that during operation all of the drive electrodes arrange along the same x-line are driven at the same time. It will be appreciated that the relative orientation of the electrode pattern does not effect the operation of the two dimension sensor array.

Referring to FIG. 3, coupled to the position sensor array 300 is a controller 308. The controller 308 is coupled to electrodes within the two dimensional position sensor array by a plurality of connections which will be described below. The controller 308 provides the functionality of a drive unit 312 for supplying drive signals to portions of the electrode pattern 302, a sense unit 314 for sensing signals from other portions of the electrode pattern 302, and a processing unit 316 for calculating a position based on the different sense signals seen for drive signals applied to different portions of the electrode pattern 302. The controller 308 thus controls the operation of the drive and sense units 312 314, and the processing of responses from the sense unit 314 in the processing unit 316, in order to determine the position of an object, e.g. a finger or stylus, adjacent the sensor 300. The electrodes 304 are sense electrodes represented by five longitudinal bars extending in the y-direction. That is to say that the drive electrodes extend along an axis in the x-direction. Adjacent sense electrodes 304 are spaced apart by a plurality of six drive electrodes 318. As shown in the figure there is also a plurality of sense electrodes 318 extending in the y-direction adjacent the final drive electrode in the x-direction. Furthermore, connections or tracks 322 are run from the drive electrodes up and down along the y-direction positioned between the drive and sense electrodes to the drive unit 312. Similar connections or tracks 320 are run from the sense electrodes to the sense unit 312. The position sensor array 300 shown in FIG. 3 further comprises a plurality of electrodes 306 interleaved between the drive electrodes and the connection track herein referred to as ground electrodes. All the ground electrodes 306 are coupled together and connected to the processing unit 316 via connection 324.

Figure 4:
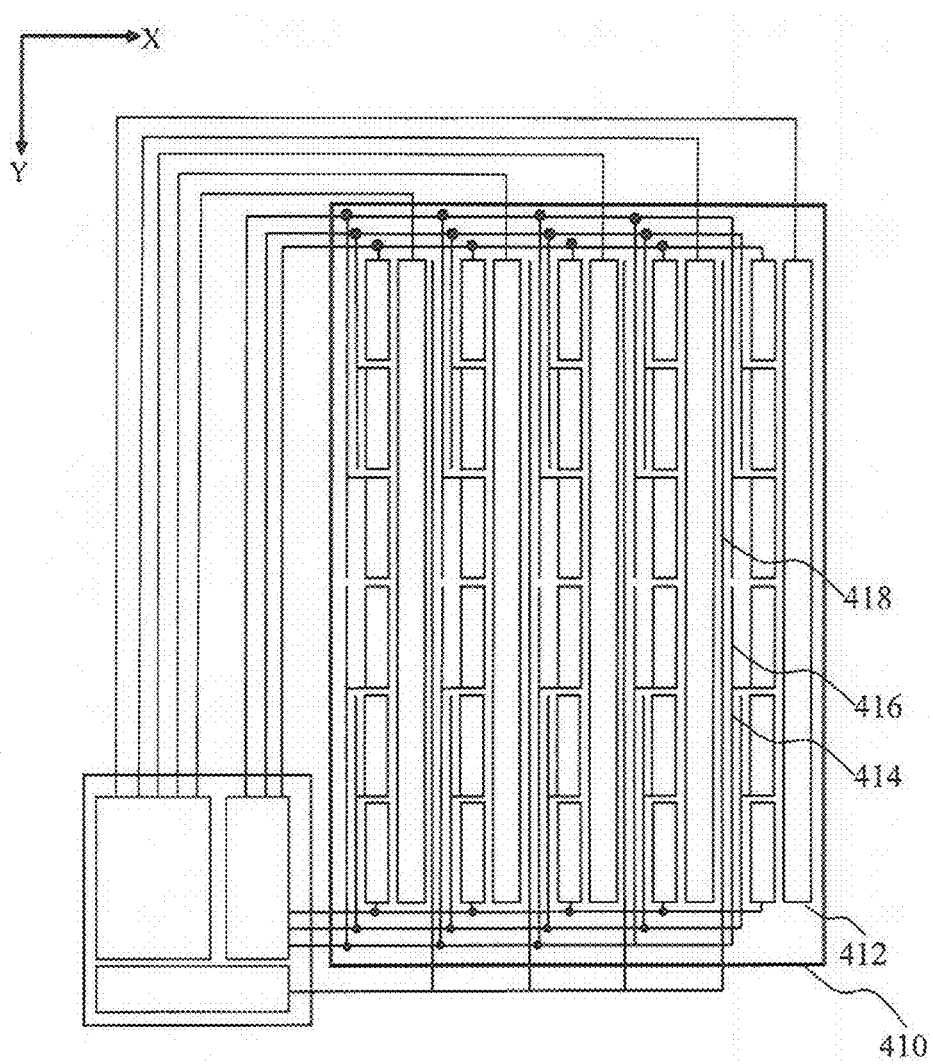
FIG. 4 shows a position sensor array according to another embodiment of the invention with drive and sense units connected via channels to a controller.

FIG. 4 is a view of a front side of a two dimensional position sensor array 400 according to another embodiment of the invention. The two dimensional position sensor array 400 shown in FIG. 4 is similar in construction and operation to the two dimensional position sensor array 300 shown in FIG. 3. However, the connecting track 414 of the electrode pattern 412 further includes an extension 416 of the track beyond the point at which it couples to the electrode as shown in FIG. 4. It will be appreciated that the extension or extension portions of the connecting tracks may be used in conjunction with the ground electrodes 418 as previously described or without the ground electrodes 418. The same idea can be applied to modify the embodiments of FIGS. 1 and 2.

It will be appreciated that the two dimensional position sensor arrays 200, 300 and 400 shown in FIGS. 2, 3 and 4 respectively may be used in conjunction with a processing unit to determine the location of one or more touches (i.e. multiple touches) or objects adjacent the position sensor using the methods described above.

It will be further appreciated that the sensor of the invention is applicable to many types of device/appliance. For example, sensors can be used with ovens, grills, washing machines, tumble-dryers, dish-washers, microwave ovens, food blenders, bread makers, drinks machines, computers, home audiovisual equipment, personal computers, portable media players, PDAs, cell phones, computers, games consoles and so forth.

FIG. 5 shows an example of a mobile personal computer (PC) 120. A touch sensor according to the present technique could be used to form part or the whole of an input control panel of the notebook PC 120. In the figure, the PC 120 is shown, which includes a display device 122 attached to a base 124, which accommodates a processor and other components typically associated with a PC. An input control panel 126 includes a keyboard 128. The input control panel 126 further includes a touch sensitive mouse pad 130. The mouse pad can be implemented using a touch sensor according to the present invention. Moreover, the display device 122 can also be implemented with a touch sensor according to the present invention overlaid on top of it to provide a touch screen. This may be particularly useful for a tablet PC.

FIG. 6 schematically shows a washing machine 91 incorporating a control panel 93 which incorporates a sensor according to the invention.

FIG. 7 schematically shows a cellular telephone 95 which may incorporate one or more sensors according to an embodiment of the invention. A two-dimensional sensor 98 according to the invention may be used to provide the button panel with buttons 99, or may be a separate sensor co-extensive with the button panel. For example, the button panel may be retained as a mechanical assembly and the sensor provided to allow drawing, writing or command gestures to be performed by the user over the button panel area, for example to compose text messages in Chinese or other Asian characters. The screen 97 may also be overlaid with a sensor according to the invention.

More generally the invention may be used in conjunction with any appliance having a human-machine interface. It is also possible to provide a sensor similar to those described above which is provided separately from a device/appliance which it may be used to control, for example to provide an upgrade to a pre-existing appliance. It is also possible to provide a generic sensor which may be configured to operate a range of different appliances. For example, a sensor may be provided that has programmable keys which a device/appliance provider may associate with desired functions by appropriately configuration, for example by reprogramming.

What is claimed is:

1. A two dimensional position sensor comprising:
   a touch-sensitive area defined by a single-layer electrode pattern arranged on one side of a substrate, the electrode pattern having a lateral extent in a first direction and a longitudinal extent in a second direction transverse thereto, the electrode pattern comprising:
      at least three electrode units extending row-wise over the touch-sensitive area longitudinally offset from one another, each electrode unit comprising:
         a drive electrode laterally extending across the touch-sensitive area; and
         at least three sense electrodes which collectively laterally extend across the touch-sensitive area and individually each occupy a non-overlapping range of the lateral extent, the sense electrodes of each particular electrode unit being longitudinally offset from the drive electrode of the particular electrode unit so that an edge of each sense electrode lies adjacent to an edge of the drive electrode, the edges of the sense and drive electrodes being separated by a gap dimensioned so that in use each pair of drive and sense electrodes capacitively couple across the gap, wherein:
            the sense electrodes comprise one or more rectangular shapes; and
            at least one sense electrode occupies a different lateral width from one or more other sense electrodes of the same electrode unit, the different lateral width of the at least one sense electrode being non-overlapping in the lateral extent with lateral widths of the one or more other sense electrodes of the same electrode unit.

2. The sensor of claim 1, wherein the sense electrodes of each electrode unit have two different lateral widths.

3. The sensor of claim 2, wherein the two different lateral widths alternate between first and second values for laterally adjacent sense electrodes.

4. The sensor of claim 1, wherein the at least three electrode units comprises a first electrode unit and a second electrode unit, the electrode pattern further comprising at least one laterally extending ground electrode positioned between a drive electrode of the first electrode unit and sense electrodes of the second electrode unit, the ground electrode operable to suppress capacitive coupling between the first electrode unit and the second electrode unit.

5. The sensor of claim 1, further comprising tracks extending from the periphery of the touch sensitive area to connect to respective ones of the sense electrodes, wherein the tracks extend adjacent to a further edge of the sense electrodes opposed to the coupling edge.

6. The sensor of claim 5, wherein the tracks have extension portions that extend in the first direction arranged between the sense electrodes of the electrode unit and a drive electrode of an adjacent electrode unit.

7. The sensor of claim 5, wherein some of the tracks from the sense electrodes connect to one lateral side of the touch-sensitive area and the other tracks connect to the other lateral side.

8. The sensor of claim 1, wherein each electrode unit has a longitudinal extent of no more than 7 mm.

9. The sensor of claim 1, wherein the drive and sense electrodes each have a longitudinal extent of no more than 1 mm.

10. The sensor of claim 1, further comprising:
    a capacitance measurement circuit connected to the electrodes and operable to acquire sets of capacitance signal values from the touch-sensitive area, each set comprising a capacitance signal value from each pair of drive and sense electrodes, each pair constituting a sensing element; and
    a processor operable to receive the sets of capacitance signal values and process each set to compute and output coordinates of single or multiple touch locations on the touch-sensitive area, the processing of each set comprising:
       identifying a particular sensing element having the largest capacitance signal value;
       defining a region of the touch-sensitive area including the particular sensing element having the largest capacitance signal value and selected ones of neighboring sensor elements;
       identifying and defining one or more further sensing elements and regions respectively, wherein each iteration excludes capacitance signal values from consideration if they lie in previously defined regions of the touch-sensitive area; and
       outputting data indicating the coordinates of the touch location in each region identified.

11. The sensor of claim 1, wherein each sense electrode has four edges, each edge of the sense electrodes being parallel to either the first or second direction.

12. A two dimensional position sensor comprising:
    a touch-sensitive area defined by a single-layer electrode pattern arranged on one side of a substrate, the electrode pattern having a lateral extent in a first direction and a longitudinal extent in a second direction transverse thereto, the electrode pattern comprising:
       at least three electrode units extending column-wise over the touch-sensitive area laterally offset from one another, each electrode unit comprising:
          a sense electrode longitudinally extending down the touch-sensitive area; and
          at least three drive electrodes which collectively longitudinally extend down the touch-sensitive area and individually each occupy a non-overlapping range of the longitudinal extent, the drive electrodes of each particular electrode unit being laterally offset from the sense electrode of the particular electrode unit so that an edge of each drive electrode lies adjacent to an edge of the sense electrode, the edges of the sense and drive electrodes being separated by a gap dimensioned so that in use each pair of drive and sense electrodes capacitively couple across the gap, wherein:
             the drive electrodes comprise one or more rectangular shapes; and
             at least one drive electrode occupies a different longitudinal height from one or more other drive electrodes of the same electrode unit, the different longitudinal height of the at least one drive electrode being non-overlapping in the longitudinal extent with longitudinal heights of the one or more other drive electrodes of the same electrode unit.

13. The sensor of claim 12, further comprising longitudinally extending ground electrodes arranged between adjacent electrode units, the ground electrodes operable to suppress capacitive coupling between adjacent electrode units.

14. The sensor of claim 12, further comprising tracks extending from the periphery of the touch sensitive area to connect to respective ones of the drive electrodes, wherein the tracks extend adjacent to a further edge of the drive electrodes opposed to the coupling edge.

15. The sensor of claim 14, wherein the tracks have extension portions that extend in the second direction arranged between the sense electrodes of the electrode unit and a drive electrode of an adjacent electrode unit.

16. The sensor of claim 14, wherein some of the tracks from the drive electrodes connect to one longitudinal side of the touch-sensitive area and the other tracks connect to the other longitudinal side.

17. The sensor of claim 12, wherein each electrode unit has a lateral extent of no more than 7 mm.

18. The sensor of claim 12, wherein the drive and sense electrodes each have a lateral extent of no more than 1 mm.

19. The sensor of claim 12, further comprising:
  a capacitance measurement circuit connected to the electrodes and operable repeatedly to acquire sets of capacitance signal values from the touch-sensitive area, each set comprising a capacitance signal value from each pair of drive and sense electrodes, each pair constituting a sensing element; and
  a processor operable to receive the sets of capacitance signal values and process each set to compute and output coordinates of single or multiple touch locations on the touch-sensitive area, the processing of each set comprising:
    identifying a particular sensing element having the largest capacitance signal value;
    defining a region of the touch-sensitive area including the particular sensing element having the largest capacitance signal value and selected ones of neighboring sensor elements;
    identifying and defining one or more further sensing elements and regions respectively, wherein each iteration excludes capacitance signal values from consideration if they lie in previously defined regions of the touch-sensitive area; and
    outputting data indicating the coordinates of the touch location in each region identified.

20. The sensor of claim 12, wherein each sense electrode has four edges, each edge of the sense electrodes being parallel to either the first or second direction.

21. A method comprising:
  identifying, by a processor coupled to a capacitance measurement circuit, a sensing element having a largest capacitance signal value, the sensing element identified from a plurality of sensing elements, each sensing element comprising a drive and a sense electrode from a particular electrode unit of a plurality of electrode units, each electrode unit comprising:
    a drive electrode laterally extending across a touch-sensitive area of a two-dimensional touch-sensitive capacitive position sensor, the touch-sensitive area defined by a single-layer electrode pattern arranged on one side of a substrate, the electrode pattern having a lateral extent in a first direction and a longitudinal extent in a second direction transverse thereto; and
    at least three sense electrodes which collectively laterally extend across the touch-sensitive area and individually each occupy a non-overlapping range of the lateral extent, the sense electrodes of each particular electrode unit being longitudinally offset from the drive electrode of the particular electrode unit so that an edge of each sense electrode lies adjacent to an edge of the drive electrode, the edges of the sense and drive electrodes being separated by a gap dimensioned so that in use each pair of drive and sense electrodes capacitively couple across the gap, wherein:
      the sense electrodes comprise one or more rectangular shapes; and
      at least one sense electrode occupies a different lateral width from one or more other sense electrodes of the same electrode unit, the different lateral width of the at least one sense electrode being non-overlapping in the lateral extent with lateral widths of the one or more other sense electrodes of the same electrode unit;
  defining, by the processor, a region of the touch-sensitive area including the sensing element having the largest capacitance signal value and one or more neighboring sensing elements;
  identifying and defining, by the processor, one or more further sensing elements and regions respectively, wherein each iteration excludes capacitance signal values from consideration if they lie in previously defined regions of the touch-sensitive area; and
  outputting, by the processor, data indicating coordinates of single or multiple touch locations on the touch-sensitive area in each region identified.

22. A method comprising:
  identifying, by a processor coupled to a capacitance measurement circuit, a sensing element having a largest capacitance signal value, the sensing element identified from a plurality of sensing elements, each sensing element comprising a drive and a sense electrode from a particular electrode unit of a plurality of electrode units, each electrode unit comprising:
    a sense electrode longitudinally extending down a touch-sensitive area of a two-dimensional touch-sensitive capacitive position sensor, the touch-sensitive area defined by a single-layer electrode pattern arranged on one side of a substrate, the electrode pattern having a lateral extent in a first direction and a longitudinal extent in a second direction transverse thereto; and
    at least three drive electrodes which collectively longitudinally extend down the touch-sensitive area and individually each occupy a non-overlapping range of the longitudinal extent, the drive electrodes of each particular electrode unit being laterally offset from the sense electrode of the particular electrode unit so that an edge of each drive electrode lies adjacent to an edge of the sense electrode, the edges of the sense and drive electrodes being separated by a gap dimensioned so that in use each pair of drive and sense electrodes capacitively couple across the gap, wherein:
      the drive electrodes comprise one or more rectangular shapes; and
      at least one drive electrode occupies a different longitudinal height from one or more other drive electrodes of the same electrode unit, the different longitudinal height of the at least one drive electrode being non-overlapping in the longitudinal extent with longitudinal heights of the one or more other drive electrodes of the same electrode unit;

defining, by the processor, a region of the touch-sensitive area including the sensing element having the largest capacitance signal value and one or more neighboring sensing elements;

identifying and defining, by the processor, one or more further sensing elements and regions respectively, wherein each iteration excludes capacitance signal values from consideration if they lie in previously defined regions of the touch-sensitive area; and outputting, by the processor, data indicating coordinates of single or multiple touch locations on the touch-sensitive area in each region identified.

* * * * *